US011197177B2

United States Patent
Wen et al.

(10) Patent No.: US 11,197,177 B2
(45) Date of Patent: Dec. 7, 2021

(54) OUTDOOR LIGHTING NETWORK AS A CONTINGENCY CONNECTIVITY INFRASTRUCTURE

(71) Applicant: SIGNIFY HOLDING B.V., Eindhoven (NL)

(72) Inventors: Yao-Jung Wen, Concord, CA (US); Dan Jiang, Westford, MA (US); Gerardus Cornelis Petrus Lokhoff, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 463 days.

(21) Appl. No.: 16/324,939

(22) PCT Filed: Aug. 22, 2017

(86) PCT No.: PCT/EP2017/071130
§ 371 (c)(1),
(2) Date: Feb. 12, 2019

(87) PCT Pub. No.: WO2018/041669
PCT Pub. Date: Mar. 8, 2018

(65) Prior Publication Data
US 2021/0282032 A1    Sep. 9, 2021

Related U.S. Application Data

(60) Provisional application No. 62/380,738, filed on Aug. 29, 2016.

(30) Foreign Application Priority Data

Sep. 22, 2016   (EP) ..................................... 16190074

(51) Int. Cl.
*H04W 24/04*  (2009.01)
*H04W 40/02*  (2009.01)
(Continued)

(52) U.S. Cl.
CPC ........... *H04W 24/04* (2013.01); *H04W 40/02* (2013.01); *H05B 47/19* (2020.01); *H04L 67/12* (2013.01); *H04W 92/10* (2013.01)

(58) Field of Classification Search
None
See application file for complete search history.

(56) References Cited

U.S. PATENT DOCUMENTS 11,076,417 B2 *   7/2021   Lei ...................... H04W 72/02
11,076,431 B2 *   7/2021   Tang .................... H04W 28/02
(Continued)

FOREIGN PATENT DOCUMENTS

| CN | 102448217 A | 5/2012 |
|----|-------------|--------|
| EP | 1885039 A2 | 2/2008 |
| WO | 2014147524 A1 | 9/2014 |

*Primary Examiner* — Otis L Thompson, Jr.
(74) *Attorney, Agent, or Firm* — Daniel J. Piotrowski

(57) ABSTRACT

An outdoor lighting network (OLN) is disclosed as a supplementary or contingency communications infrastructure for smart city systems. The OLN may integrate light points within the network as receivers which are switched from a standard OLN communication protocol to a D2D based protocol upon disruption of a primary smart city systems communications network, wherein each communication protocol includes a respective message prioritization method. Aspects of the disclosure additionally includes methods and apparatus for implementing an outdoor lighting network which can act, in cases of primary communication failure, as a D2D network in order to pass messages from smart city system field devices, through the converted D2D OLN network and to a smart city system central manager for proper handling and distribution of the smart city system field device communications.

14 Claims, 15 Drawing Sheets

(51) Int. Cl.
*H05B 47/19* (2020.01)
*H04W 92/10* (2009.01)
*H04L 29/08* (2006.01)

(56) References Cited

U.S. PATENT DOCUMENTS

| | | |
|---|---|---|
| 2015/0021990 A1 | 1/2015 | Myer |
| 2015/0249735 A1 | 9/2015 | Miller |
| 2015/0250042 A1 | 9/2015 | Aggarwal et al. |
| 2016/0007138 A1 | 1/2016 | Palanisamy et al. |
| 2016/0044652 A1* | 2/2016 | Xue .................... H04W 72/048 370/329 |
| 2016/0143050 A1* | 5/2016 | Saiwai ............... H04W 72/1263 370/329 |
| 2017/0156071 A1* | 6/2017 | Lakshmi Narayanan ................... H04W 28/08 |
| 2017/0255785 A1* | 9/2017 | Vidal Meca ............ H04L 12/46 |
| 2019/0036595 A1* | 1/2019 | Ohtsuji .................... H04B 7/15 |
| 2021/0219190 A1* | 7/2021 | Cao ........................ H04W 88/16 |
| 2021/0227442 A1* | 7/2021 | Yiu ................. H04W 36/00837 |

* cited by examiner

OUTDOOR LIGHTING NETWORK AS A CONTINGENCY CONNECTIVITY INFRASTRUCTURE

CROSS-REFERENCE TO PRIOR APPLICATIONS

This application is the U.S. National Phase application under 35 U.S.C. § 371 of International Application No. PCT/EP2017/071130, filed on Aug. 22, 2017 which claims the benefit of European Patent Application No. 16190074.1, filed on Sep. 22, 2016 which claims the benefit of U.S. Provisional Patent Application No. 62/380,738, filed Aug. 29, 2016. These applications are hereby incorporated by reference herein.

BACKGROUND

Outdoor lighting fixtures are typically spaced evenly through a wide area. Further, these fixtures/light points are typically integrated within a communication management system for centralized command and control of each of the fixtures. As a result, oftentimes outdoor lighting systems incorporate a communication network integrating a central management system to each of the light points in the outdoor system. Such regularly dispersed hardware of the distributed system components for an outdoor lighting system makes the Outdoor Lighting Network (OLN) a good candidate for an alternative contingency communication network.

The operations of these outdoor lighting networks in buildings and public spaces rely heavily on connectivity to enable central (supervisory) controls, remote monitoring and inter-/intra-system communications. Connectivity between the OLN central management entity and the distributed system components (light points) is often established through wireless networking. In the case of implemented outdoor lighting network systems, the connectivity between the OLN central management system (CMS) and the light points and sensors may be based on wireless mesh networks (ZigBee or other proprietary protocols), cellular networks or various other known communication protocols.

As well, smart city systems (SCS) are designed to integrate emergency responders, traffic hardware, lighting networks and other municipal infrastructure elements together into a single network. These systems may integrate multiple city communication functions which may include both first-responder emergency communications, transportation and possibly even outdoor lighting network control management systems. In the case of the intelligent transportation systems (ITS), communication between traffic center control and field devices may use an integrated SCS IP-based networks either wired (twisted pair, coax, fiber, etc.) or wireless. For ITS as well as other smart city systems, wireless implementation have become more and more popular due to deployment flexibility and lower costs. Sometimes these communication systems can also include emergency responders such as fire, ambulance, police and the like. Thus, a heavy reliance is placed upon the regular communication networks for the SCS communication connectivity.

In conjunction with these developments, LTE cellular systems and particularly the evolution of LTE toward 5G in 3GPP are improving various device to device communication standards and implementations. Device-to-device (D2D) communication, currently being standardized in 3GPP, is a cellular communication technology that can offload a cellular network's communication to enable cellular terminals to communicate with each other directly and bypassing the underlying cellular communication base. Thus, D2D communication allows wireless data exchange between two devices without the standard eNB or NB backbone network infrastructure as long as the individual User Equipment (UE) are within each other's signal reception range. Essentially, messages may be transmitted from a sender to a distant target via communications of pairs of D2D-enabled entities in between, essentially creating a hop-by-hop message exchange through the intermediate entities. Addressee/destination inclusion within the data transfer is utilized to implement such protocol in some examples.

These device-to-device cellular networks have attracted increasing interests with the proliferation of wireless devices and the fast progress of mobile computing and wireless network services, particularly where the D2D implementation is not reliant on eNB/NB or other backbone scheduling and oversight. Such applications enable nearby UE's to exchange data directly with each other over D2D links without involvement of cellular base stations. The advantages of D2D communications lie in high-rate local data transmission, high spectral frequency efficiency by reusing cellular resources and the capability of offload of the local cellular network and individual base station (BS). From user's perspective, D2D applications provide authenticated peer-to-peer communications and context-aware services. From the operator's aspects, benefit lies in enhancing network operations through user cooperation on the D2D links. Further development and advancement of 3GPP LTE standards and proximity services (ProSe) has been conducted for D2D in which technical specifications are being discussed by the industry.

Further, it is be necessary for Smart City System communications to be robust and in some instances redundant due to the use for emergency responders to communicate during various emergency situations and disasters. For example, during natural disasters, primary communication systems may be interrupted or fail completely. In such instances, communications through primary networks may be unfeasible or become affected for short or long periods of time. Additionally, reliance on singular lines of communication for multiple service personnel can prove troublesome in instances of network failures. Additional and/or alternative drawbacks of these and/or other techniques may be presented.

SUMMARY

Some implementations of the present disclosure and specification are related to utilizing an outdoor lighting network (OLN) as a supplementary or contingency communications infrastructure for smart city systems. The OLN may utilize and integrate multiple light points within the network as receivers which are switched from a standard OLN communication protocol to a D2D based protocol upon disruption of the primary SCS communications network. Some implementations are additionally and/or alternatively directed towards methods and apparatus for implementing an outdoor lighting network which can act, in cases of primary communication failure, as a D2D network in order to pass messages from smart city system field devices, through the converted D2D OLN network and to the SCS Central Manager (SCS CM) for proper handling and distribution of the smart city system field device communication. The use of the additional and/or alternative DE2D OLN network can be as a result of a primary communication failure or the need to re-route particular smart city system field device communications. Each of the OLN communication and D2D based protocols can have a different communication message prioritization methods to accommodate different emergency or implication communication needs.

In many implementations, the OLN network may be operative to convert each of the OLN field devices/light points from normal communication mode to a D2D mode upon detection of a communication network failure. Due to their widely and evenly distributed geographic location, the OLN devices may be nearby an SCS field device that is no longer operable to communicate on the regular SCS communication network. The OLN devices may thus autonomously convert their communications from a normal communication protocol to a D2D communications protocol thereby becoming visible to nearby SCS field devices for relay of data and/or direct communications to the SCS Central Manager.

Alternatively, OLN devices could receive broadcast status messages from a OLN central management system or from the smart city system central manager indicating a communication failure thereby causing SCS field devices and related OLN devices to switch from their standard non-compatible communication protocols to D2D communication mode.

For example, the OLN devices could detect a communication systems failure and automatically switch from a first standard communications protocol, such as a wireless mesh network or cellular network, to a D2D communications mode. The D2D enabled OLN devices could then be detectable as D2D communication points by various field devices in the smart city system which could then utilize the OLN devices as a communications relay point. All such communications passed to the OLN D2D enabled devices when in D2D mode, could be forwarded to the related infrastructure in the smart city system in a hop by hop relay.

In some implementations, the present disclosure provides an outdoor lighting system for use as a contingency connectivity infrastructure, comprising: an outdoor lighting network central management system, the outdoor lighting network central management system in communication with a plurality of light points forming an outdoor lighting network, each of the plurality of light points emitting illumination and communicating with other light points and/or the outdoor lighting network central management system by first communication protocol; wherein each of the light points in the outdoor lighting network has instructions stored in a memory and a processor to execute the instructions to: switch the light point to a second communication protocol, the second communication protocol a device to device protocol wherein each of the light points is operable to transmit a message to a geographically adjacent light point in the outdoor lighting network; further wherein each of the light points in the outdoor lighting network further has instructions to communicate with a field device of a separate system network not associated with the outdoor lighting network by the second communication protocol; wherein the second communication protocol is a device-to-device (D2D) cellular communication protocol; and wherein each of the outdoor lighting network light points is operable to autonomously switch between the first communication protocol and the second communication protocol.

This system and other implementations of technology disclosed herein may each optionally include one or more of the following features. The outdoor lighting system in various implementations include an outdoor lighting network central management system which has instructions stored in a memory and a processor to execute the instructions to communicate in a normal communication mode to communicate with the plurality of light points of the outdoor lighting network in the first communication protocol and a D2D communication mode to communicate with the plurality of light points in the second communication protocol.

Still other implementations may include an outdoor lighting network central management system which includes a message processor, the message processor operable to receive a message from the separate system network and decode the received message and to further encode the message to be recognized by the plurality of light points when communicated in the D2D communication mode. Further implementations may include the outdoor lighting network central management system includes a device and mapping mechanism which his operable to geographically correlate a plurality of field devices from the separate system network to a lighting network service map. Still further optional elements may include the outdoor lighting network central management system further having a map correlator to correlate the lighting network service map and a service map from the separate system network. Optional other implementations may have the outdoor lighting network central management system being a part of a larger computer network, the larger computer network defining a smart city system, the smart city system having a central manager server, the central manager server in communication with a plurality of smart city systems, the outdoor lighting network being one of the plurality of smart city systems.

Further implementations may include the smart city system further having a plurality of distributed system components, at least one of the distributed system components being a plurality of smart city field devices, at least one of the smart city field devices including the field device of the separate system network. Other implementations may include wherein the outdoor lighting network light points are each operable to enter a discovery mode, wherein the discovery mode identifies nearby devices, the nearby devices being either adjacent outdoor lighting network light points or field devices of the separate system network.

Other optional implementations may include the first communication protocol is unique to the outdoor lighting network and wherein the second protocol is a device to device protocol. An additional implementation may include the outdoor lighting network light points communicate in the second protocol and transmits data such that the data through a plurality of devices until the data reaches a destination. Still other implementations may include wherein the outdoor lighting network light points include instructions to implement a dynamic routing algorithm to allow each outdoor lighting network light point to include routing information in the transmitted data. Various implementations may include the first communication protocol for the OLN being a cellular based protocol and still others may include the first communication protocol may be a mesh network.

This method and other implementations of technology disclosed herein may also include a method for providing a contingency connectivity infrastructure using an outdoor lighting network, comprising: forming an outdoor lighting network with a plurality of light points; communicating between the plurality of light points and a lighting network central management system in a first communication protocol; switching the plurality of light points from the first communication protocol to a second communication protocol, the second communication protocol a proximate device to device communication protocol; receiving by a recipient one of the light points from the outdoor lighting network, a data stream including a destination address, the destination address being outside of the outdoor lighting network, the data stream being transmitted by a device outside of the outdoor lighting network; transmitting by the recipient light point in the outdoor lighting network, the data stream in the second communication protocol to an adjacent recipient device, the adjacent recipient device being either one of the plurality of light points from the outdoor lighting network or an external device outside of the outdoor lighting network; wherein the switching of the plurality of light points between the first communication protocol to the second communication protocol is done autonomously.

Other implementations may include one or more non-transitory computer readable storage media storing instructions executable by a processor (e.g., a central processing unit (CPU)) to perform a method such as one or more of the methods described above. Yet another implementation may include a system of one or more computers and/or one or more servers that include one or more processors operable to execute stored instructions to perform a method such as one or more (e.g., all) aspects of one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Some implementations of this specification are directed to systems, methods and apparatus for providing an outdoor lighting network as a contingency communication infrastructure. The OLN light points may be operable to communicate in a first mode/protocol to the management system and to each other, for standard communication. The first protocol having a first message priority method, which assigns message priorities according to predetermined criteria (e.g. normal operating conditions), where certain messages have a higher priority than other for transmission during operation using the first protocol communication method. The OLN light points may further be operable to communication in a second (D2D) mode/protocol of operation providing the ability to relay information and data from a non-network source, through the OLN to a destination. The second (D2D) protocol may have a second message priority method, which assigns message priorities according to predetermined criteria (e.g. emergency operating conditions), where certain messages have a higher priority than other for transmission during operation using the second protocol communication method. This prioritization can also be done dynamically by the OLN central management or field devices for both modes/protocols. Such OLN devices may further be able to switch protocols autonomously based upon defined conditions or may react to broadcast messages of primary communication line failures in a primary city-wide network infrastructure.

Operations of modern systems in buildings and public spaces rely heavily on connectivity to enable central and supervisory control, remote monitoring and inter-/intra-system communications. Connectivity between the OLN central management entity and the distributed system components such as light points or field devices is often established through wireless networking. In the case of outdoor lighting network, the connectivity between the central management system for the outdoor lighting system, OLN CMS 11, and the light points 12 and/or sensors within the OLN may be based on cellular networks (2G, 3G, 4G, 5G, NB-IoT, LTE-eMTC, EC-GSM-IoT) or wireless mesh networks using various peer to peer topology standards such as IEEE 802.11, IEEE 802.15, IEEE 802.16 and protocols such as ZigBee, Ad hoc On-demand, Dynamic Source Routing among others. Connectivity between the OLN central management entity and the components of the network may also be outside of standard mesh topology schemes and include star topology such as cellular or other ultra-narrow band communication technologies. In the case of an intelligent transportation system (ITS) mentioned above in a Smart City System, the communication between a traffic center and its field devices may use IP-based networks either wired (twisted pair, coax, fiber, etc.) or wirelessly. For ITS as well as other smart city systems, wireless implementation have become more and more popular due to deployment flexibility and lower costs.

Figure 1:
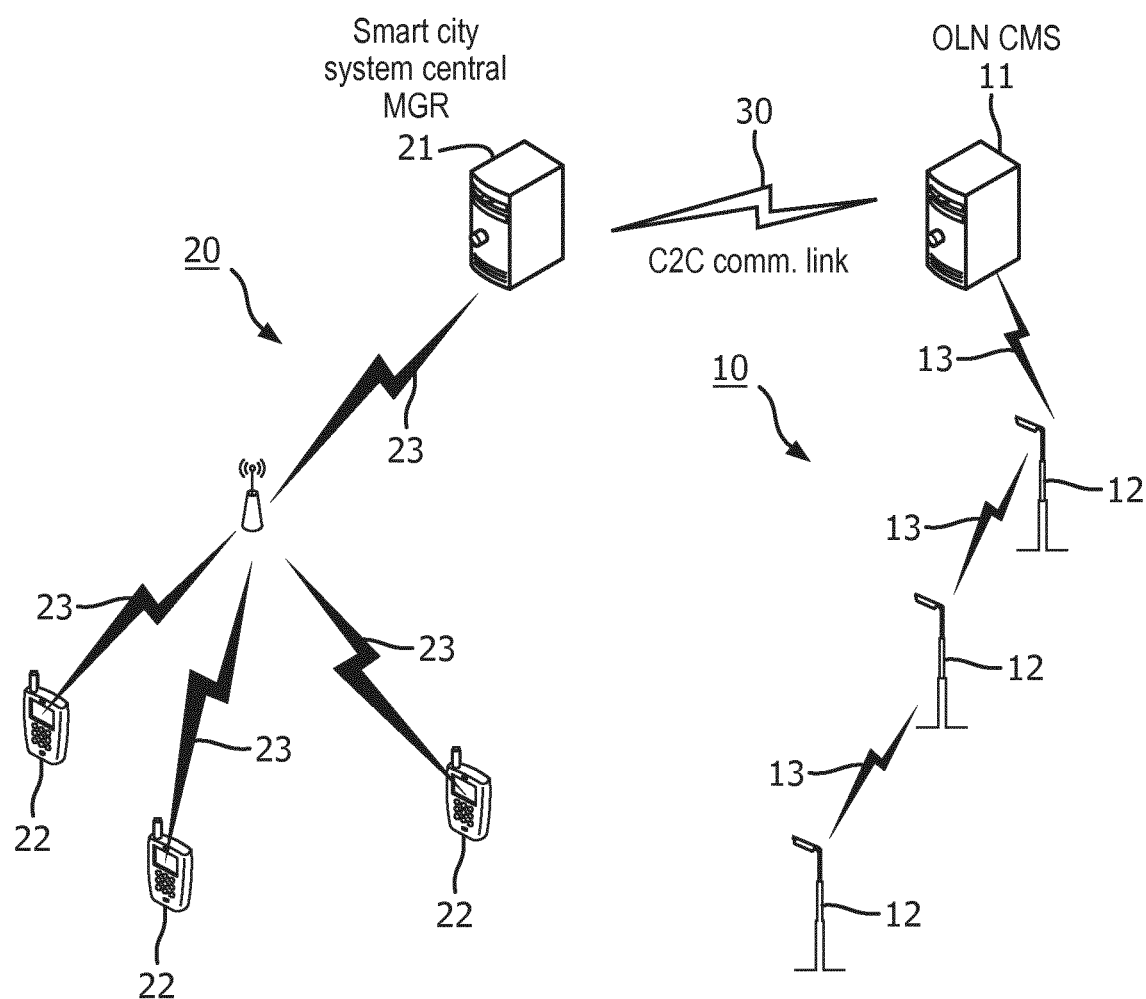
FIG. 1 illustrates an example topology of a smart city system integrating various field user equipment in combination with an outdoor lighting network having a plurality of field devices or light points and the communication paths for both.

As shown in FIG. 1, OLN 10 implementations typically have evenly distributed light points or field devices 12 throughout a service area. In the present implementation, each light point may be equipped with D2D technology thus making the OLN a network infrastructure for other systems using D2D if a normal network infrastructure fails. This disclosure utilizes such D2D convertibility of the OLN light points and sets forth a method for an OLN 10 to function as the contingency network infrastructure for other smart city systems, such as ITS, to retain essential services in the event of such communication failure.

The present disclosure utilizes device-to-device (D2D) communication enabled OLN light points or elements 12 as the contingency network infrastructure to provide other smart city systems a communication path that routes critical data through the OLN to the target device or management system when regular connectivity service is disrupted. In essence, OLN 10 becomes another layer of connectivity that contributes to the resilience of other D2D-enabled smart city systems.

As depicted in FIG. 1, an OLN 10 is provided which details a plurality of field devices/light points 12 each integrated into a proprietary mesh-type network for the OLN or other network communication protocol noted herein, in various embodiments. The OLN communications network can be wired or wireless and allow for communication between the light points 12 and the primary control system, an OLN central management system 11 (OLN CMS). The OLN CMS may be a server 60 or other computer with associated processor(s) 818, storage subsystem 824, file storage 826 and memory subsystem 825, among other elements, an example of which may include the elements of FIG. 13A The OLN CMS 11 controls, monitors and manages the connected outdoor lighting system wherein each of the light points/field devices 12 are in communication with the OLN CMS 11 via standard network communication mode pathways 13. The pathways 13 indicated in the various figures are exemplary only as well as the implied topology of a mesh network as many other implementations and topologies may be utilized. Under normal operation, the CMS exchanges data with the OLN field devices/light points 12 using a physical network and communication protocol specific to the OLN communication link 13.

In some variations, the CMS 11 may establish a data exchange with a smart city system 20 using a dedicated application level center-to-center C2C communication protocol on top of a peer-to-peer network connection 30.

Such dedicated communication channel may be directly integrated with the CMS 11 via a network interface 816 or other similar architecture. The C2C link 30 and communication pathway may be utilized, in various implementations, for interconnection and data transfer between the Smart City System CM 21 and the OLN CMS 11 and particularly for mapping, device location and updates for service network maps. Such C2C communication connection 30 can also, in aspects, be a transmission pathway for communications between field devices when in the D2D mode of operation, as discussed herein.

Similarly, in FIG. 1, the smart city system 20 is depicted which may include in embodiments, the central manger 21, access points and a plurality of User Equipment(s) (UE) 22. The smart city system 20 further may optionally include in various implementations a central manager 21 and, as noted, UE's/field devices 22. In one embodiment, the smart city system may be an intelligent transportation system (ITS) where the central manager 21 is an ITS center, such as a traffic management center, an incident management center, a transit management center, a traveler information center, etc., and the field devices 22 may be traffic control devices, dynamic message signs, traffic cameras, etc. The C2C communication 30 may include well-defined information level dictionaries (e.g. TMDD) and data may be exchanged through eXtensible Markup Language (XML) or DATEX II at application level using web services. In another embodiment, the smart city system 20 may include a city emergency alert system, where the central manager is a community emergency management center 21 and the field devices 22 may be emergency response vehicles, smart phones that are subscribed to the system, etc. The central manager 21 may in embodiments consists of a computer system responsible for monitoring, control and management of the smart city system and have corresponding architectural features as noted above used with the OLN CMS. Under standard operations, the central manager may establish communications and connectivity 23 with the field device UE's 22 using a network protocol and medium specific to the smart city system and in some implementations may go through a WAN or access point as depicted.

Figure 5:
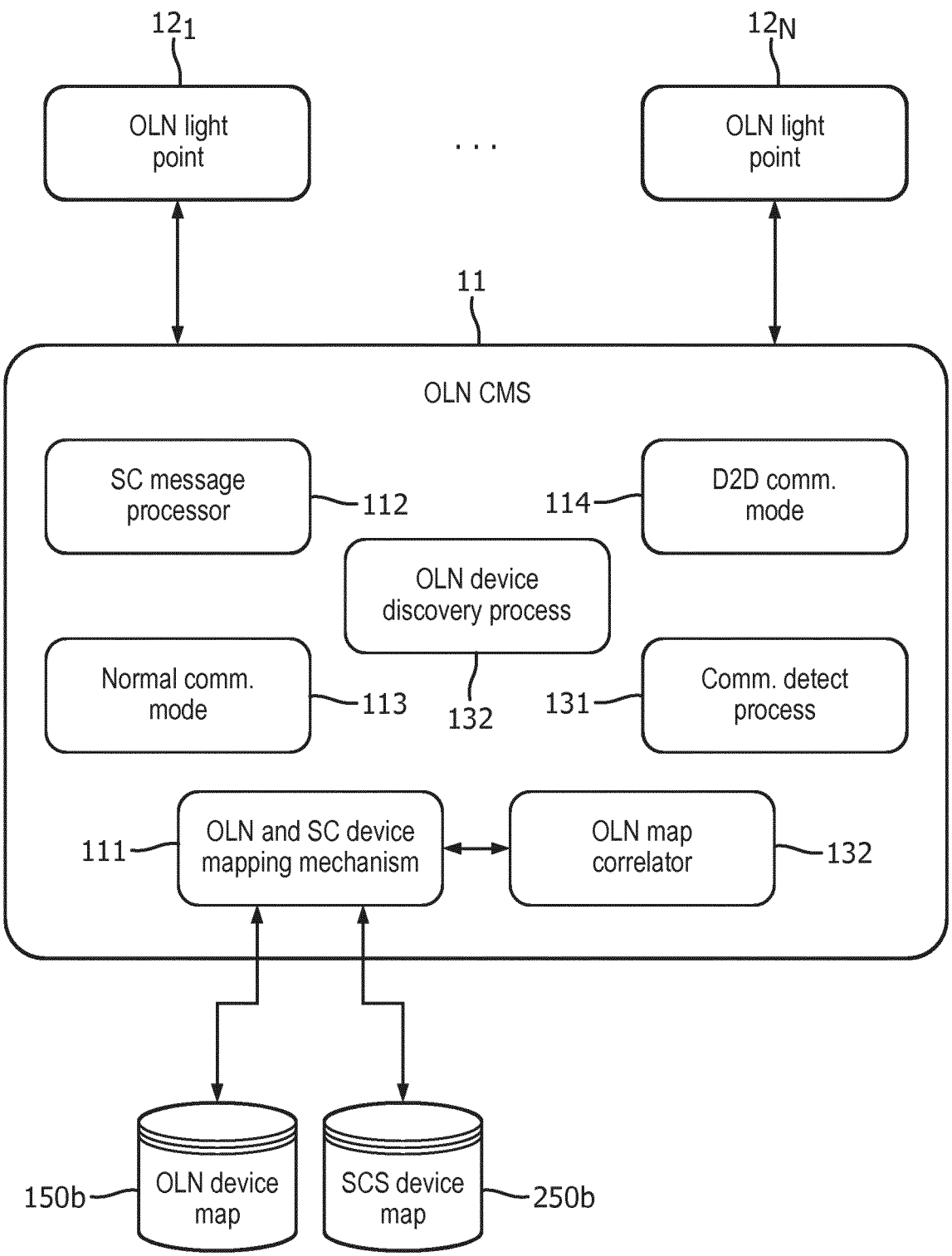
FIG. 5 schematically depicts the architecture of an outdoor lighting system central management system/server.

In various implementations under standard communication, the OLN CMS 11 will control the various light points and/or sensors 12 via communication channels 13 which may be wireless and/or wired or a combination thereof. Various features may be implemented as are known in outdoor lighting management. However, as may be expected, the various light points 12 may be evenly geographically distributed over a city wide area and all or some subset under the control of the OLN CMS 11 or alternative OLN systems may be integrated with the OLN 10 as depicted. Such light points 12, due to their even geographic distribution, may be utilized as a D2D communication entry points for, in some implementations, an ad-hoc D2D network when a primary communication channel, such as communications network channel 23, fails. As a result of the ad hoc nature of the contingency infrastructure, the OLN CMS may maintain an OLN Device Service Map 150*b* along with an SCS Device service map 250*b*, as shown in FIG. 5. Similar service mapping may be maintained by the SCS CM and associated network management systems.

Figure 4:
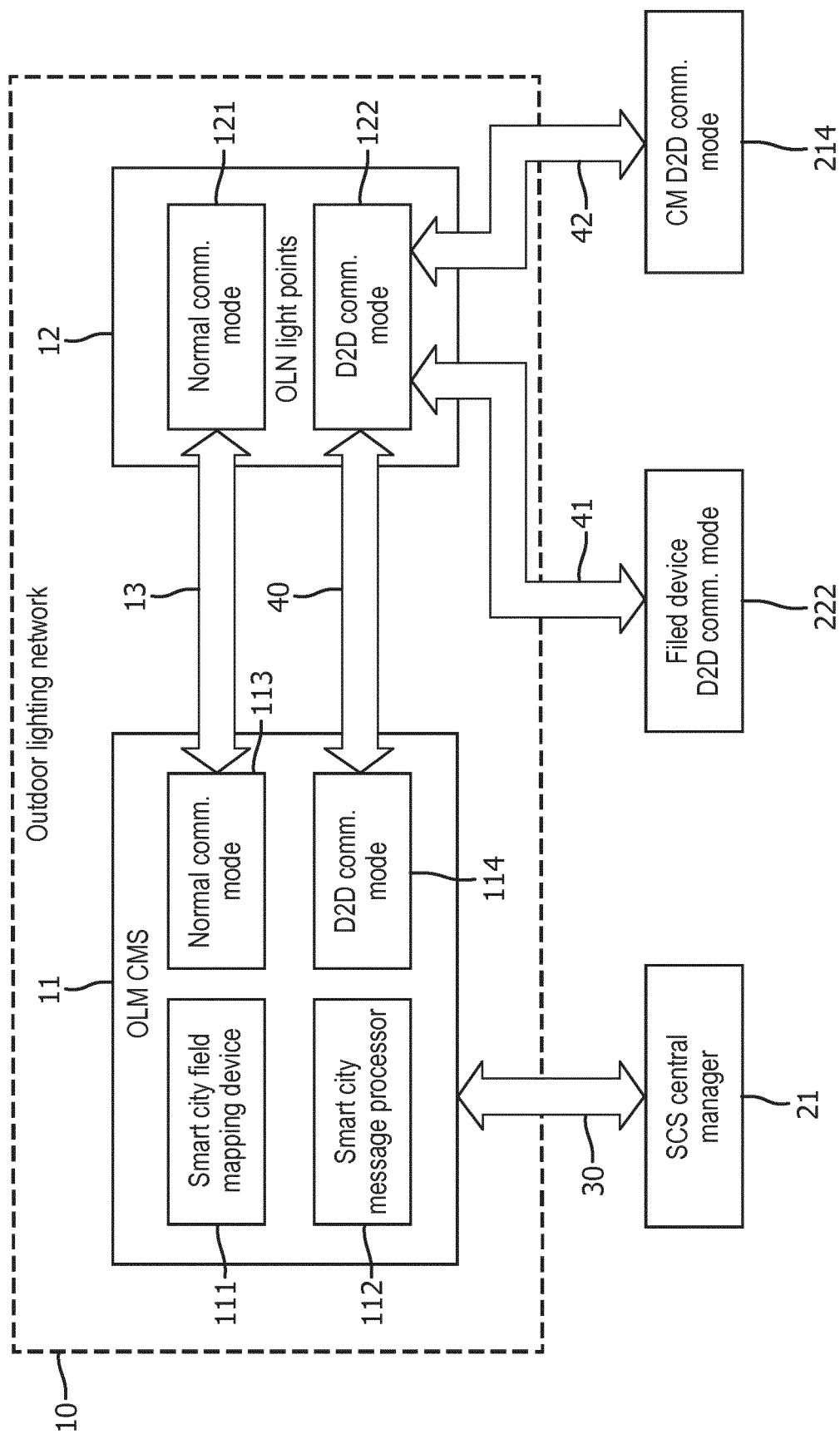
FIG. 4 schematically depicts the Outdoor Lighting Network elements including the central manager and the various light points/field devices.

As depicted in FIG. 4, the outdoor lighting network 10 may include or incorporate both an OLN CMS 11 and multiple OLN devices/light points 12. The OLN CMS 11 may, in some embodiments, consists of a smart city system device mapping mechanism 111, a smart city message processor 112, a normal communication mode 113 and a D2D communication mode 114. The OLN CMS 11 may be in communication with the SCS central manager 21 via C2C link 30 for transfer of mapping, device and other control and reporting data exchanges, to name a few. Such communication exchange between the servers/management systems and within the smart city system may include a significant number of operating parameters and such description not limited to the embodiment or architecture described herein.

Each of the light points 12 within the OLN 10 may include an illumination source, such as LEDs or other light generating structure, and also include a processor and associated memory to appropriately control illumination and communications. Thus, a communication port/pathway may be incorporated within the light point and include either wired or wireless communication to support multiple modes of communications. Also, each of the light points may include in various implementations instructions stored on the memory and executable by the processor to both control the illumination of the illumination sources as well as control message and communication handling by the light point to other light points, central management servers as well as other devices. Such on-board electronics and instructions supports message handling and transfer across a plurality of communication modes and non-OLN devices, as discussed herein.

The smart city system device mapping mechanism 111 of the OLN CMS 11 may in various implementations geographically correlate the smart city field devices 22 to the lighting network service map. Separate OLN database maps 150b and SCS device maps 250b may be maintained or may be integrated for access by the OLN CMS 11. Device and database maps 150b and 250b may be maintained separately, integrated together or correlated on a regular basis. As well, local copies of the database and/or maps or a master copy may be maintained at an offsite location, accessible to each of the subnetworks, depending on implementation architecture. Information related to the smart city field devices, including device identities, coordinates, function sets, etc., may be obtained from the smart city system central manager 21 through C2C communication 30 and incorporated into the lighting network service map or integrated therewith. With this mapping, the OLN CMS will be able to determine the exact location of a particular smart city device and identify the nearby light points or other OLN field devices.

In implementations, as depicted in FIG. 4, the OLN CMS 11 may include a normal communication pathway 13 to the plurality of OLN light points 12 and may also include a switchable D2D communication mode 114 for alternative communication pathways to the devices 12. When in D2D mode, the OLN CMS 11 may communication via D2D communication pathway 40 to the OLD light points.

The OLN light points/devices 12 may include both a normal communication mode 121 as well as a D2D communication mode 122. When in D2D communication mode, the light points 12 may communicate with SCS field devices 22 via communication link 41. In, other implementations as discussed herein, the light points 12 may further communicate directly with the SCS CM in DoD comm mode 214 via D2D link 42 as may be needed when under a communication failure status.

As well, and as shown in FIG. 5, the OLN CMS may be linked to a plurality of devices $12_1$ through $12_N$. The CMS may additionally have in various other embodiments an OLN device discovery process 132, communications line detect process 131, OLN and SCS device mapping mechanism 111 and an OLN map correlator 132 for correlating devices from both the OLN and the SCS system 20 within the OLN service map.

The various and multiple light points or field devices of the OLN $12_1$ through $12_N$ may have each an associated device discovery process which allows each of the light points, when in D2D mode, to discover and detect nearby D2D devices for communication relays, as will be noted below. Such device detect process, allows the OLN field devices 12 to locate nearby D2D enabled devices and act as a data relay therefrom to associated and other nearby devices. Further, the field devices 12 of the OLN may autonomously detect and determine system wide communication failure, by either time out conditions of communication links 13, or through other means and switch automatically from the primary first communication protocol to a secondary D2D protocol.

Figure 3:
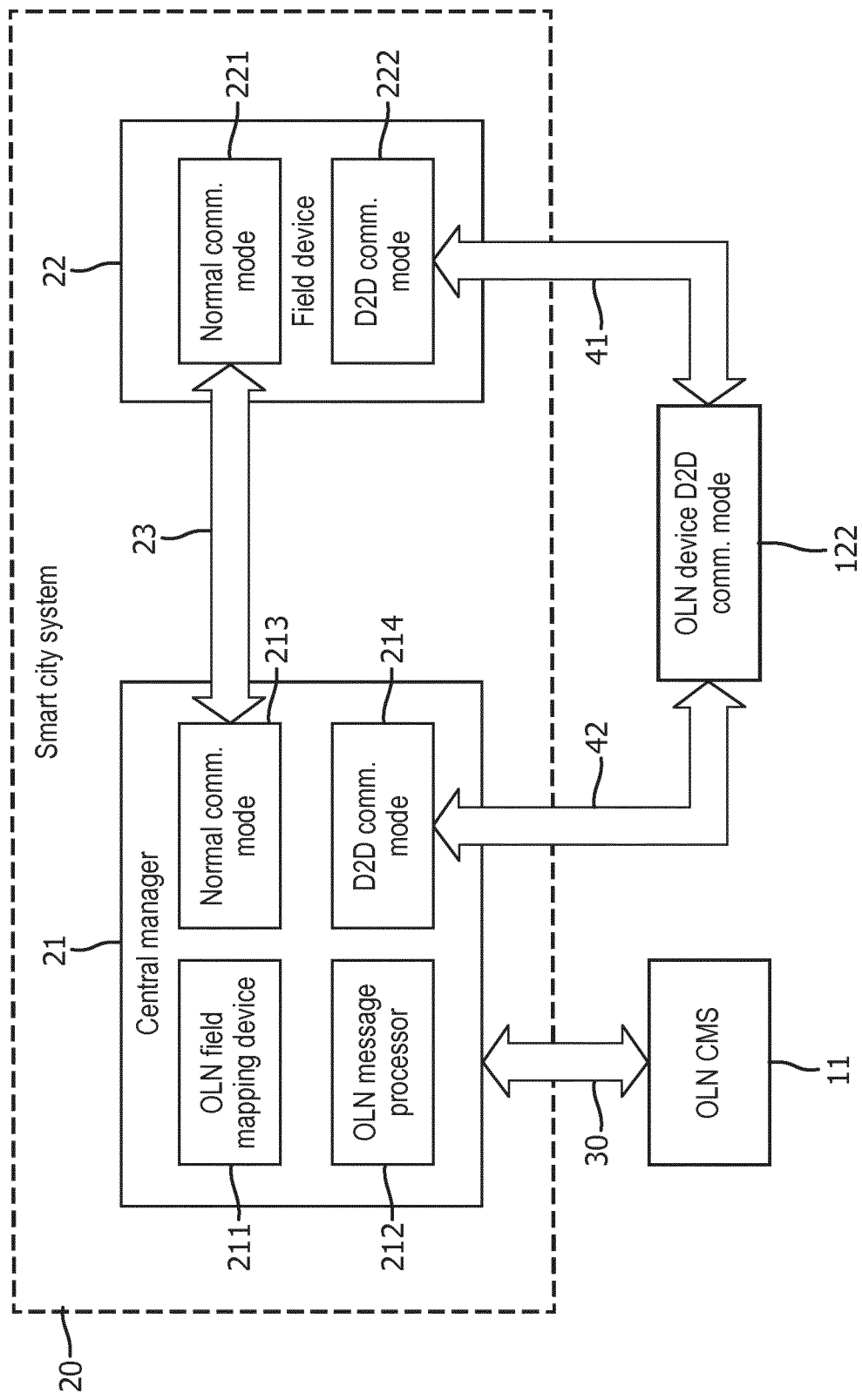
FIG. 3 schematically depicts the Smart City System elements including the central manager and the various field devices.
Figure 6:
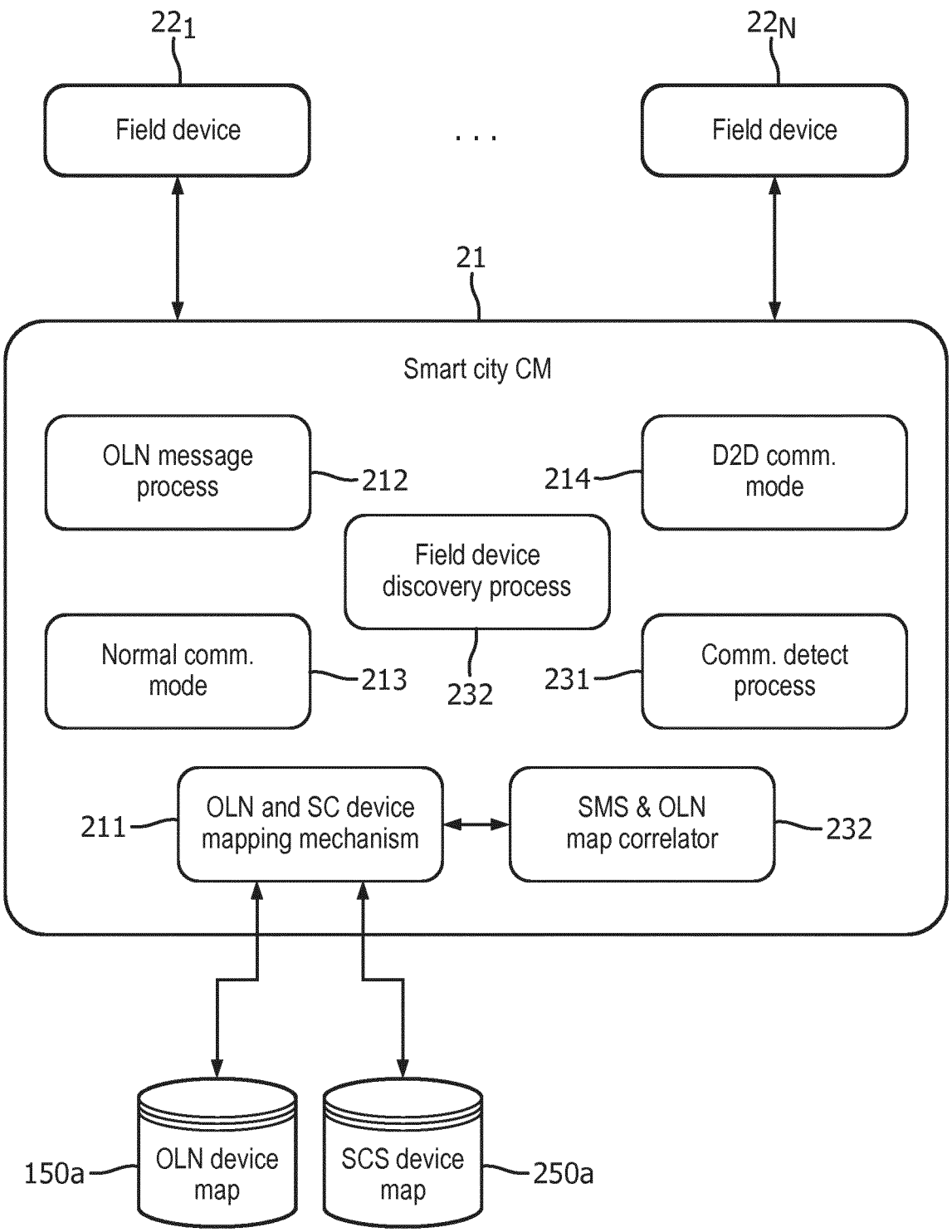
FIG. 6 schematically depicts the architecture of a smart city system central manager/server.

Similarly, as depicted in FIGS. 3 and 6, one example of a smart city system 20 and SCS CM 21, the SCS 20 includes a central manager 21 which has an OLN Field Device Mapping Mechanism 211, an OLN message processor 212, normal communication mode 213 and D2D communication mode 214. The Normal Communication Mode process allows communication between the central manager 21 and the SCS field device 22 through normal communication mode process 221. Likewise, D2D communication processor 214 allows D2D communication via communication channel 42 directly between the SCS CM 21 and an OLN light point/device 12 communication mode processor 122. Such direct connection would allow, as explained herein, hop by hop communication relay between an SCS field device 22 and the SCS CM 21 via the various components of an OLN lighting network 10 even after communication systems failure of the primary communication pathway. SCS Field device 22 further has a D2D communication mode process 222 which allows communication with the OLN light point 12 D2D communication mode processor 122 for initiating a hop by hop relay via the OLN 10. These field devices 22 of the SCS can similarly be autonomous in switching from their primary communication network to the D2D network and include device discovery means as similarly noted in the OLN field devices 12.

In the example of FIG. 6, the SCS CM 21 may include multiple field devices $22_1$ through $22_N$ connected to the CM 21. The central manager 21 may also include an OLN message processor 212, field device discovery processor 232, OLN and SC field device mapping mechanism 211 and SCS & OLN map correlator 232, either of which may be in communication with OLN map 150a and SCS device map 250a. The SCS CM 21 may further include a D2D communication mode processor 214 and Normal communication mode processor 213 with a communication detect processor 231 which can detect, either directly or remotely, a primary channel communication line failure thereby initiating D2D communication modes. The OLN message processor 212 also assigns a message priority to the each OLN message, based on which communication mode is being used. Each communication mode message priority is based on one more operating mode criteria, for example, a (first) normal operating mode set of criteria or a (second) emergency mode set of criteria. The message prioritization for each communication mode can also be done dynamically based on, for example, the number of OLN light points 12 or smart city field devices 22 in operation, the nature of an emergency, etc.

In general and in some embodiments, features set forth herein may include a center-to-center (C2C) data exchange scheme between the OLN CMS 11 and a smart city system central manager 21. The systems of both the SCS CM and the OLN CMS provide a data exchange of device information and service network maps between OLN CMS and other smart city central manager in order that device locations and service map information can be kept up to date and correlated. In some instances, single OLN device services map 150a and SCS device services map 250a databases may be maintained and even integrated. In other alternatives, each central management system may have their own copy of the relevant database/maps.

The OLN CMS 11 may further be equipped with D2D communication capability and can operably switch to and from a proprietary OLN communication protocol to a D2D mode when regular communication fails. Notification of primary communication pathway failure within the Smart City System 20 may come directly from the SCS CM 21 via communication link 30 which may then be propagated throughout the OLN system via communication lines 13 or via D2D communication path 42. Likewise, in various examples, broadcast status messages may propagate through the network with communication line status information. As well, in some embodiments, message response time delays between the OLN CMS 11 and the SCS CM 21, EU field device, light points and/or broad cast device discovery notices in D2D mode can be utilized as a communication status triggering event.

In various aspects, the OLN light points 12 may be equipped with D2D communication process and/or processors and can switch to D2D communication mode when regular communication fails and/or a message of communication link failure is received. As well, the smart city system central manager 21 may be equipped with D2D communication capability and can switch to D2D mode when regular communication fails. Further, in some embodiments, the smart city field devices 22 are equipped with D2D communication capability and can switch to D2D mode when regular communication fails. Thus, the combined outdoor lighting network and smart city system elements described herein may include a D2D communication scheme, including a common application layer protocol, between the OLN light points 12 and the smart city system field devices 22 to allow continued communication of the SCS field devices even after a primary communication path failure. Such functionality can be supported by, for example, a hop by hop relay of any communication and/or data from the field devices via the OLN light points 12 to maintain continued and robust communications.

In some implementations of using OLN as a contingency connectivity infrastructure as depicted in FIG. 1, where the light points are switched into D2D communication mode. In the scenario shown in FIG. 2(*a*), C2C communication link 30 is not affected while all other regular communication network is disrupted. The smart city system central manager may send a message to the OLN CMS using C2C communication link. The OLN CMS switches to D2D communication mode and sends the message to the nearest light point using D2D communication. The message is subsequently relayed using D2D communications between pairs of the intermediate light points until it reaches the target D2D-enabled smart city field device 22. Likewise, return communication may be implemented via transmission by the field device 22 to a D2D enabled light point 12 in the outdoor lighting network. Associated destination and/or address information may be included within the message header for handling by subsequent D2D enabled devices thereby allowing transfer of data from the field device 22 to the SCS CM 21 via the multiple and now contingency connectivity infrastructure of the OLN.

In the example of FIG. 2(*b*), C2C communication 30 is also disrupted but the smart city system central manager is capable of switching to D2D communication mode. In this case, the intended message may be sent from the smart city central manager to the closest light point and/or to the OLN CM using D2D communication, which is then routed through pairs of intermediate light points using D2D communications until arriving at the target destination smart city field device.

Prior to any communication line disruption, the SCS CM may have detected all field device via the field device discovery process 232 wherein field devices have been cataloged and stored in the SCS device map 250*a* and correlated within both the SCS communication network and also, in some variations, an adjacent OLN network. A similar process may be implemented in the OLN CM with process 132. Such device identification, mapping and geographic placement may be stored in the SCS Device map and, based upon additional information received from the adjacent OLN data exchange, correlated mapping information can be cataloged. This correlated data created by the SCS and OLN map correlator 232 along with the OLN and SCS device mapping mechanism, can effectively geographically locate devices and determine their relative location to each other, to the networks and to adjacent D2D capable networks and determine appropriate data pathways. Further, the information created by the correlator may be stored in the respective databases 150*a* and 250*a* which, in various other embodiments, may be combined. These mapped field devices and networks represented in the databases are then available to the SCS CM 21 for message routing in case of normal communication mode failure.

Thus, in various implementations, the OLN field device mapping mechanism 211 geographically correlates the OLN field devices 12 to the smart city service map and may store such information in the related database. Information, such as OLN device identities and location, may be obtained from the OLN CMS 11 through C2C communication 30 and incorporated into the smart city system service map. By maintaining an up to date system map of not only SCS field devices and networks, but also related OLN system information, devices and location, the central manager may geographically relate its field devices 22 with the outdoor lighting network light points 12 in the OLN system 10.

In alternative implementations, the OLN CMS 11 may as well, concurrently, on conjunction with or in a data sharing mode, utilize an OLN and SCS device mapping mechanism 111 with an OLN map correlator 132 in order to similarly maintain locational awareness of the field devices from both the SCS and the OLN. In various implementations, the device maps 150*b*/250*b* for OLN may be a shared mapping database, may be a shadow mapping database or may be independently maintained within the OLN CMS with variable frequency data correlation between various similar system mappings.

Figure 2A:
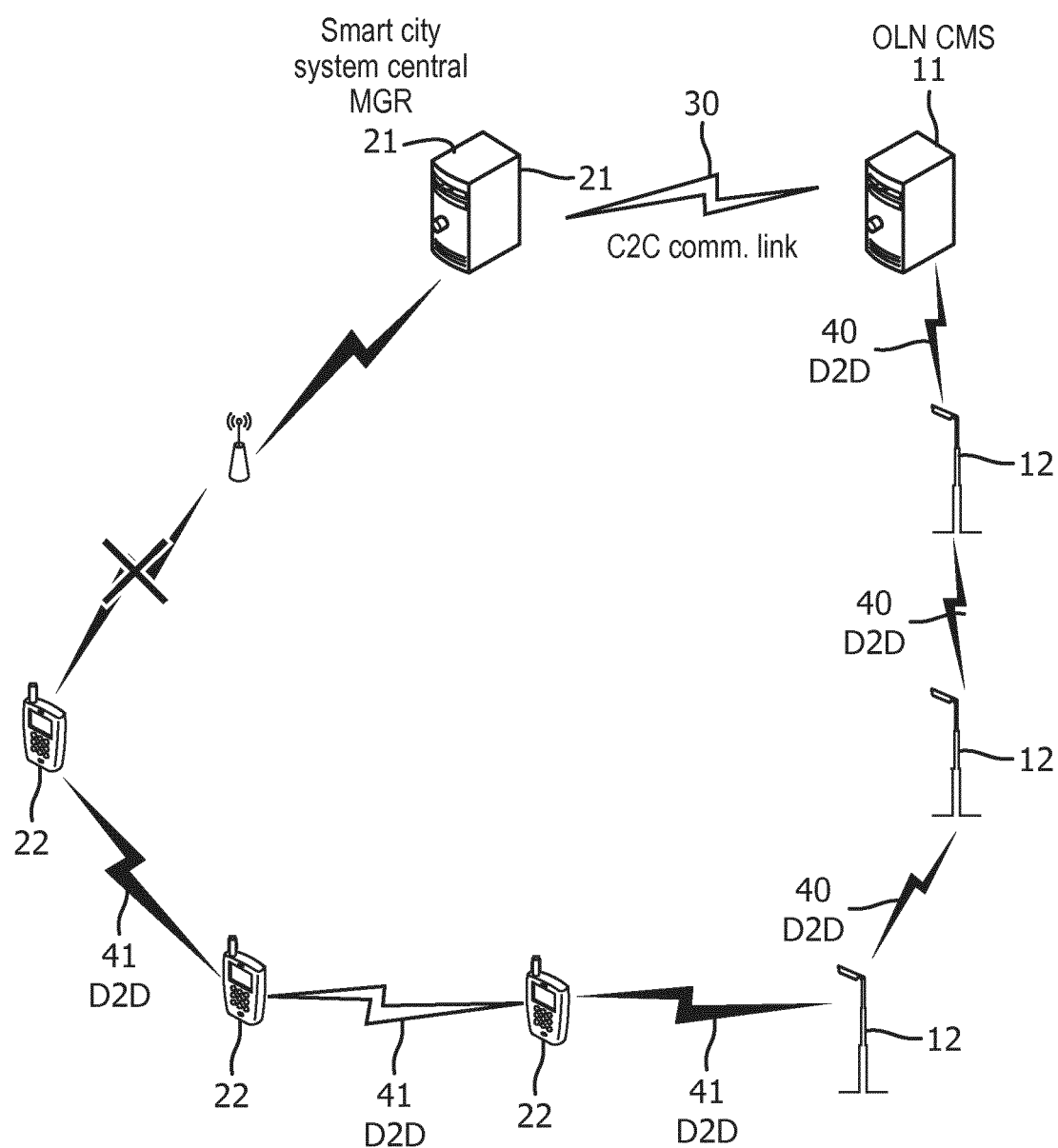
FIG. 2A illustrates communication topology of the system shown in FIG. 1 wherein the primary communication lines are in failure mode for the smart city system and the outdoor lighting network becomes a D2D access point for SCS field devices and the OLN CMS maintains contact with the SCS central manager and/or server.

In one example, as depicted in the embodiment of FIG. 2A in combination with FIG. 1, the OLN 10 is provided as a contingency connectivity infrastructure where the light points 12 are switched into D2D communications mode. In the example depicted, the C2C communication line 30 is not affected while the normal communication network 23 between the SCS CM 21 and SCS field devices 22 is disrupted. The SCS CM may detect such communication disruption via the communication detect process 231 and then may relay such information through its network or through adjacent networks of the system. Alternatively, the individual devices of either networks within the systems may autonomously determine such network failure and switch to D2D communication mode and similarly switch back after recognition of system link valid status using normal communication pathways.

As noted in the above example, the center to center primary communication pathway 30 may, as depicted, be available and messages from the SCS CM 21 to the field devices may be routed through the converted OLN 10. In such an embodiment, the SCS field devices 22 are effectively removed from communication with the SCS CM 21 due to the failure of the normal communication link 23. In such embodiment, the smart city system central manager 21 may determine the appropriate route to send a message to the field device by integrating the OLN system map information and light points 12 as communication pathways. The SCS CM may then send a message to the field devices through the outdoor lighting network via the OLN CMS using C2C communication channel 30. Upon receipt of the message from the SCS CM, the smart city message processor 112 may decode the data received from the smart city system central manager through the C2C communication 30 and encode the messages that can be recognized by the OLN devices when communicated to the distributed devices 12 in D2D mode 114. In transmitting messages between differing networks, the message will need to be recognized by both OLN field devices and the SCS field devices when communicating in D2D mode. Thus, the present system, in implementations, encodes of the messages by the smart city message processor 112 to allow for D2D mode message handling via distributed devices 12 so that the mixed system messages are recognized by both the OLN field devices 12 and the SCS field devices. Message encoding may be required in implementations since the last hop of a message will be from the OLN field device to an SCS field device. Alternatively, should communication pathway 13 between the OLN CMS 11 and the devices 12 be available, the message may be relayed via normal communication mode 113 for relaying to the individual SCS field devices 22 through the outdoor lighting network 10. In such embodiments, even when using normal OLN communication network links 13, the OLN field devices will still need to switch to D2D mode when handing over the message to the SCS field device, such as indicated as communication link 41 in FIG. 2A.

Thus, in implementations, the OLN devices/light points 12 may have two communication modes, the normal communication mode 121 and the D2D communication mode 122. In the normal communication mode 121, the device and network may utilize a network protocol specific to the OLN for data exchange with the OLN CMS 11. Alternatively, the OLN light points 12 may switch to D2D communication mode 122 which can be activated when the normal communication channel 13 is unavailable or by alternative means such as a broadcast message or instructions from the OLN CMS and/or SCS CM, or other means. Further, the OLN light points 12 may autonomously switch to the D2D communication mode after failure to establish regular connectivity with other OLN light points 12 or with the OLN CMS 11 in the normal communication mode.

Alternatively, when the field devices/light points 12 of the outdoor lighting network 10 are in the D2D communication mode 122, the OLN light points 12 can exchange data with any other devices within its cellular signal reception range using a common application layer protocol. In one embodiment, the OLN device 12 exchanges data with a nearby peer OLN device using D2D communication. In another embodiment, the OLN device can exchange data directly with the OLN CMS 11 using D2D communication link 40 when the CMS is within a predefined communication range. In other aspects, the OLN device 12 is operable to exchange data with a nearby smart city system field device 22 that also operates in the D2D communication mode via communication channel 41.

The OLN CMS may determine that the primary communication networks for the SCS have failed via either broadcast messaging or other data transfer to the OLN CMS from the SCS CM or other device or upon autonomous determination. Upon receipt of a message to be transferred to the field device from the CMS, the OLN CMS may switch to D2D communication mode 114 and send the message to the nearest light point using D2D communication mode channel 40. The message then may be relayed using D2D communications between pairs of the intermediate light points until it reaches the target D2D-enabled smart city field device operating in D2D communication mode 222.

Standard protocols may be utilized in handling, by each node/OLN Device in D2D mode, messages on a hop by hop basis until the message arrives at a destination address. Such ad hoc relay of message content or other data may be implemented in the newly formed D2D network formed from the outdoor lighting network and may be implemented utilizing addressee/destination tagging of data content so that the message is relayed through the network until received by the addressee/destination.

In some implementations, the OLN CMS 11 may modify the operations of the outdoor lighting network and of the individual light points or devices 12 after notification of a communications failure of the smart city system. Such notification can be received by broadcast, unicast or other method or can be embedded within a data exchange between the SCS CM and the OLN CMS. Subsequent notification to the light points or OLN field devices 12 requiring switching to D2D communication mode may be initiated by the OLN CMS or by the SCS CM or other means, as noted herein. Similarly, once the primary communication channels are turned to operative status, broadcast or other messages may be relayed through the networks to return to primary communication protocols.

Figure 2B:
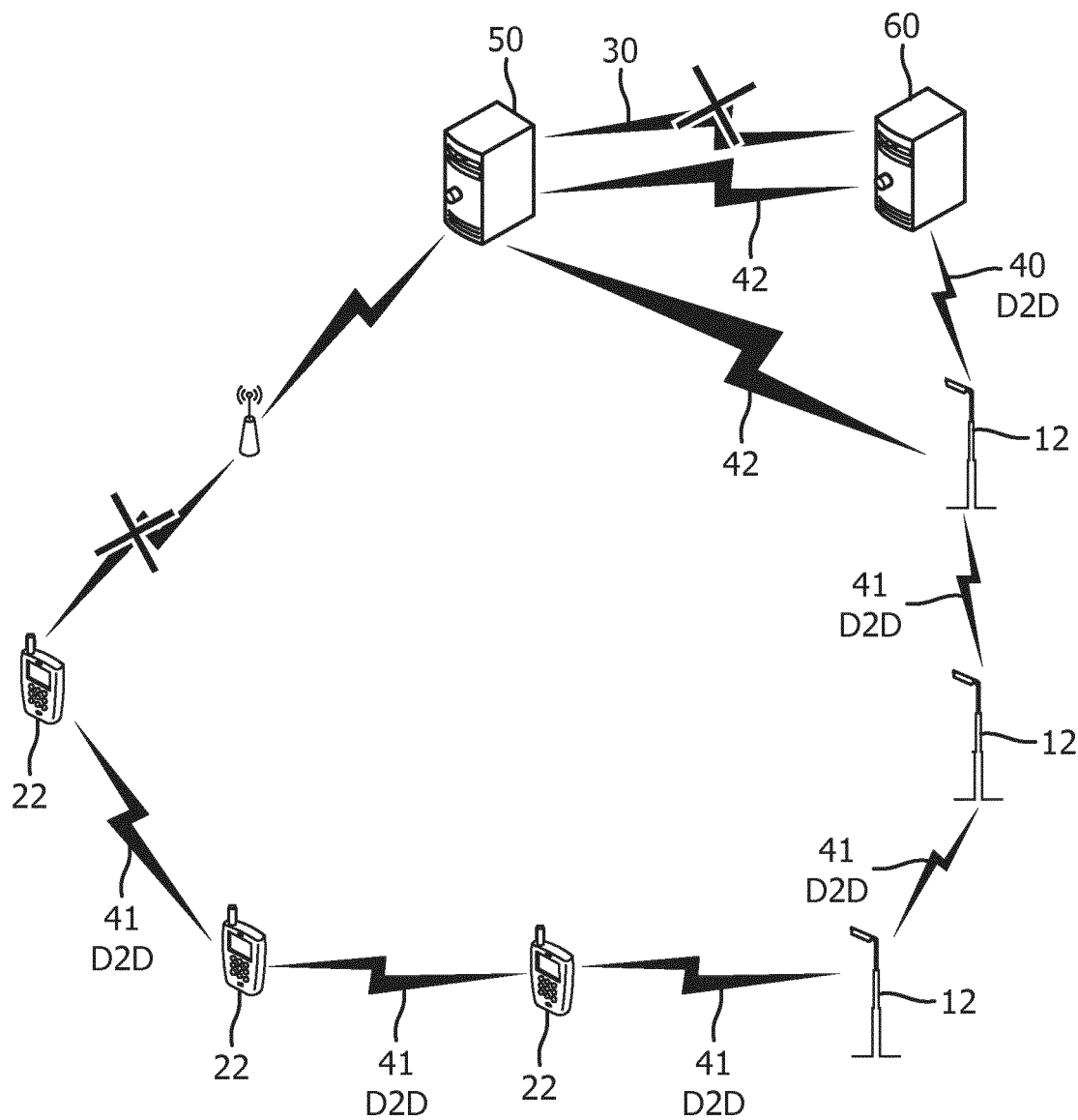
FIG. 2B illustrates communication topology of the system shown in FIG. 1 wherein the primary communication lines are in failure mode for the smart city system and the outdoor lighting network becomes a D2D access point for SCS field devices and the OLN CMS does not have contact with the SCS central manager and/or server.

In alternative implementations, the C2C communication link 30 may be effected as depicted in FIG. 2B. In this example, the C2C communication is disrupted but the smart city system central manager is operable of switching to D2D communication mode. In such implementation, any forwarded message may be sent from the smart city central manager to the closest OLN light point 12 using D2D communication, the message then routed through pairs of the intermediate light points 12 using D2D communications until arriving at the target smart city field device.

In various implementations, the OLN device 12 can implement the D2D communication mode 122 and exchange data along D2D communication channel 42 to bypass the OLN CMS 11 entirely and exchange data with a nearby smart city system central manager 21, which can operates in D2D communication mode 214 with the same application layer protocol.

In conjunction with the outdoor lighting network and in various implementations, the smart city system central manager 21 may include an OLN field device mapping mechanism 211, an OLN message processor 212, a normal communication mode 213 and an optional D2D communication mode 214.

The OLN field device mapping mechanism 211 depicted in FIG. 3 is operable in various implementations to geographically correlate the various and multiple OLN light points/field devices 12 to the smart city service map. Information, such as OLN device identities for the plurality of devices, may be obtained from the OLN CMS 11 through C2C communication 30 and incorporated into the smart city system service map. The SCS central manager is thus operable to geographically relate its field device 22 with the light points 12 in the OLN system 10 and recognize the extent of the various networks adjacent to the SCS field devices 22.

Further, and in addition, implementations for the smart city system CM 21, the OLN message processor 212 may incorporate two capabilities depending on the routing of messages. In a first aspect, the OLN message processor 212 may decode the data received from the OLN CMS 11 through the C2C communication protocol 30 in normal operation for use in the OLN field device mapping mechanism 211. Information and other relevant data received from the OLN CMS 11 regarding the devices 12 of the OLN can be geographically correlated and mapped relevant to the SCS network and devices and maintained for quick referencing. Also, the message processor 212 may be operable to encode messages that are to be forwarded to the smart city field device 22 via the outdoor lighting network via D2D communication path 42 in a format that can be recognized by the OLN devices 12 when communicated directly to the OLN devices 12 in D2D mode 214. Thus and as a result of such operability, the D2D communication mode 214 may be activated when the SCS CM 21 is experiencing connectivity failures using the normal communication mode 213 and the OLN network of light points provides a contingency connectivity infrastructure using switchable D2D communication capabilities.

In another aspect of the SCS CM 21, when the normal communication channel 23 is disrupted but the C2C communication channel 30 is intact, the central manager may be operable to transfer a message to the intended SCS target field device through the OLN CMS 11 through C2C communication link 30. The message may then be routed hop-by-hop from the OLN CMS 11 through the intermediate OLN devices 12 to the target smart city field device using D2D communications 40, 41 between pairs of the OLN devices/light points 12.

In another implementation, when the normal communication mode channel 23 and the C2C communication channel 30 are both disrupted and the central manager 21 is capable of D2D communication, the central manager itself may switch to a D2D communication mode 214 for direct communication with the reconfigured OLN field devices 12. The OLN message processor 212 may then encode the message to the intended field device in a communication format recognizable by the OLN devices at the D2D communication application layer, and sends the message to the nearby OLN device 12 using D2D communication channel 42. The message may then be routed through series of intermediate OLN devices 12 until it reaches the intended SCS target field device 22 using D2D communications 42, 41. In such implementation the smart city field device 22 may have two communication modes, a normal communication mode 221 and a D2D communication mode 222. The normal communication mode 221 may, among some implementations, use a network protocol specific to the smart city system for data exchange with the central manager 21. Further the D2D communication mode 222 of the SCS field device 22 can be activated autonomously by the field device 22 itself when detecting a disruption in the normal communication channel 23. The D2D communication mode 222 thus is operable to enable the field device to exchange data with other entities within its cellular signal range using a common application layer protocol. Such other devices, as noted, include the switchable outdoor lighting network field devices which may communication in both the standard communication mode 121 via channel 12 and are also functional to switch to D2D communication mode 122 using channels 40/41/42 depending on the destination. Of course, the various channels can be a single channel and use a single application layer but are shown separately in an effort to indicate separate communication paths of the various embodiments. Likewise, various other communication channels may be shown in the figures separately but may in fact, in use and operation of the OLN field devices and OLN CMS, include the same or different communication configurations, protocols or application layers. By application layer it is meant to include an abstraction layer that specifies the shared protocols and interface methods used by hosts and other devices in a communications network.

Figure 7:
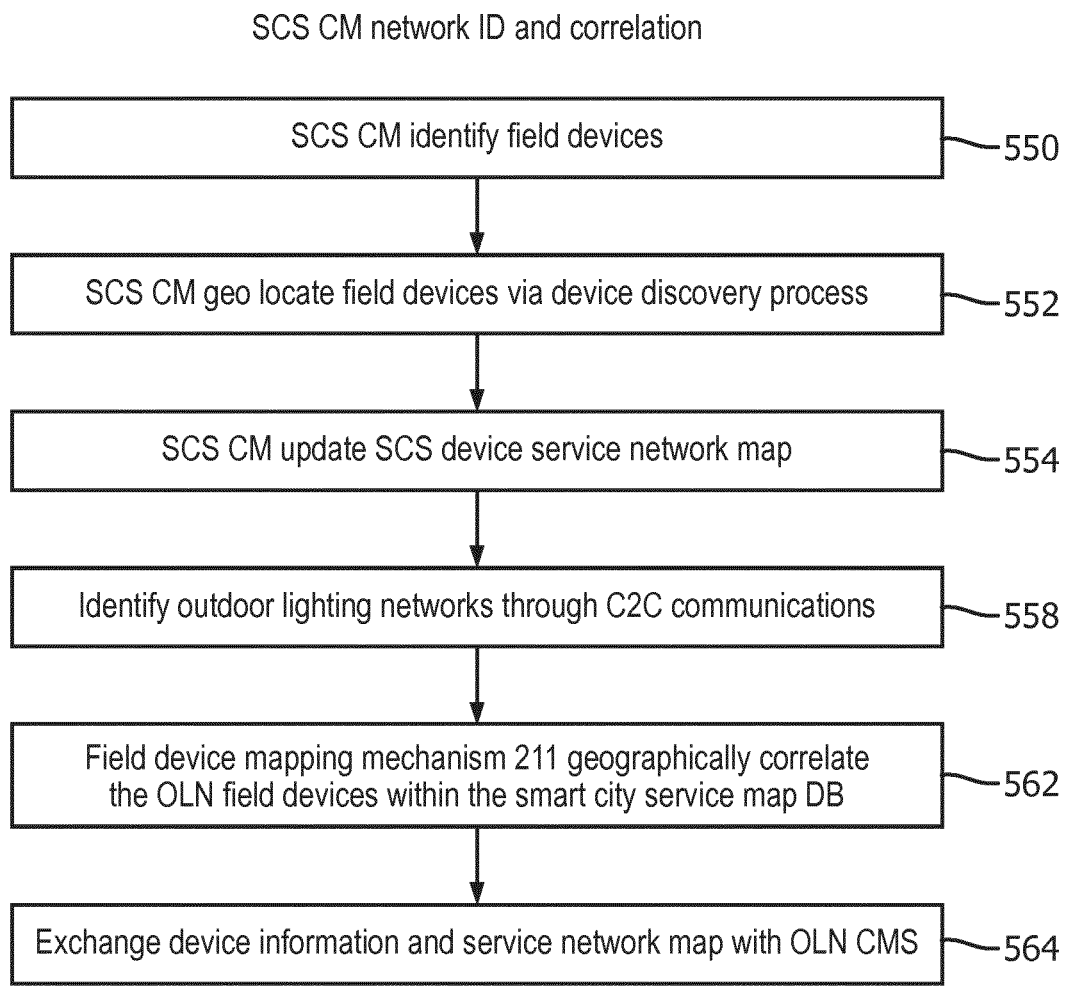
FIG. 7 is a flowchart illustrating an example method of determining field devices in a Smart City System and updating device information and service maps.

In some implementations, as detailed in FIG. 7, the SCS CM may be have memory with instructions stored thereon to implement various methods and features described and implemented through execution on a processor. As detailed in the example shown, the SCS CM 21 may identify field devices 22 within its network detectable area at step 550. At step 552, the SCS CM may further geographically locate the SCS field devices 22 and then, at step 554, update the SCS device map and service network map located within the SCS device map database 250a. A similar database may be kept at peripheral networks, such as an outdoor lighting network 10 database 250b and such databases may be routinely correlated via data exchange. Utilizing dispersed data sets may allow each management system to autonomously detect and update corresponding maps and geo-locate populations of field devices within the service area.

At step 558, the various peripheral networks such as an outdoor lighting network 10 may be identified and correlating communication via C2C communication 30 may occur between the two servers handling the management functions of the various networks. Any identified outdoor lighting networks may be correlated and be cataloged and, in some examples, located relative to the SCS network at step 562. Finally, the data obtained by the SCS CM may be exchanged with the OLN CMS so that both maps may be correlated, updated and maintained at step 564.

Figure 8:
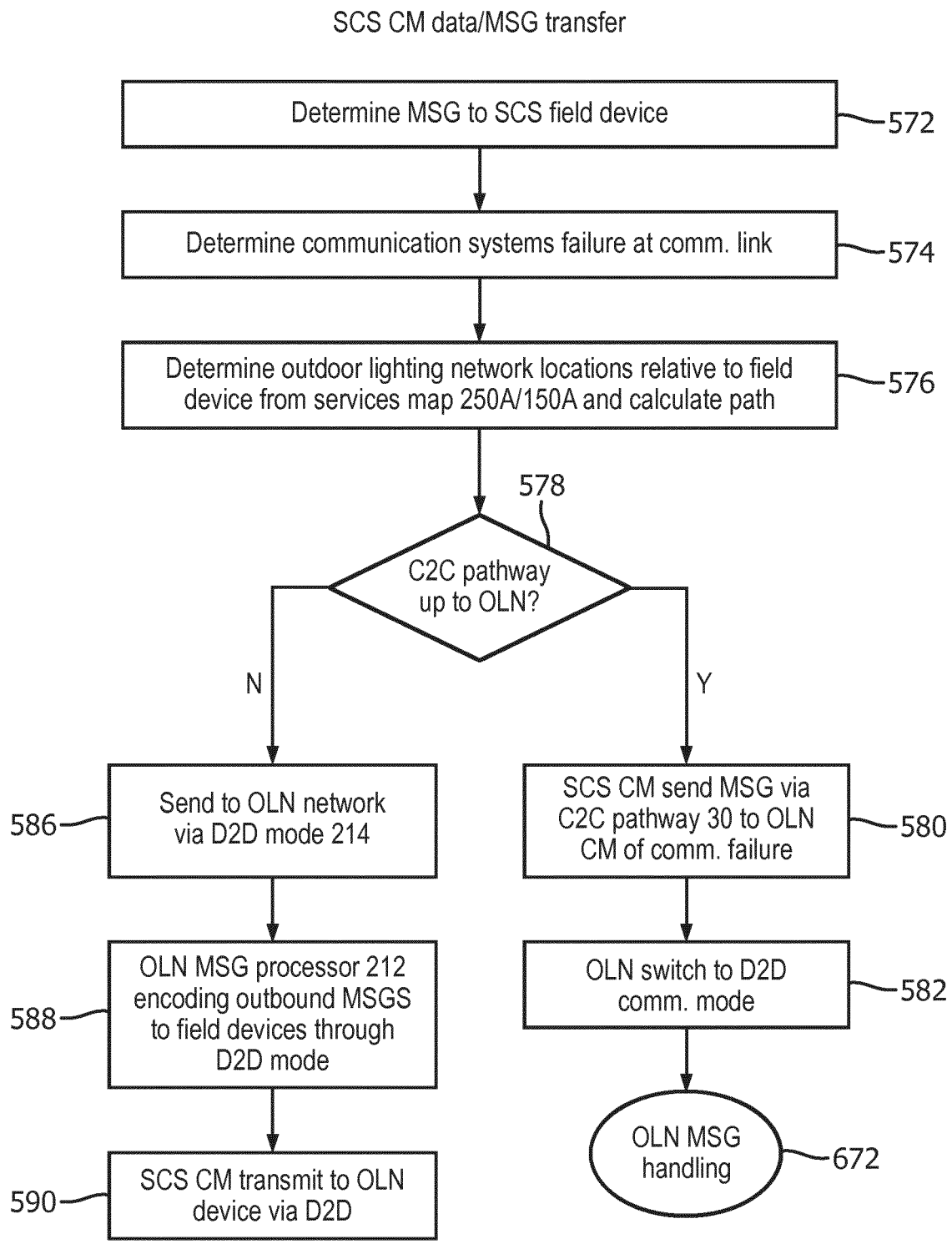
FIG. 8 is a flow chart illustrating an example method of managing message and data traffic from the SCS after primary communications line failure in the D2D mode.

As depicted in the implementation for a data transfer between the SCS CM to an external network as depicted in FIG. 8, the SCS CM may be operable to utilize the converted OLN system and network as a contingent connected infrastructure during network failure.

In implementations, at step 572, the SCS CM may receive a message for handling within the SCS network 20 at step 572. The SCS CM may determine a communication network or systems failure of a primary communication network 23 to the field devices 22 either through time-out communication clocks or via status messaging, for example at step 574. The central manager may determine if the C2C communication line 30 is active at step 578 and if so, continue to transport messages via message routing through the link to the OLN CM with appropriate addressing. Such data and message traffic rerouted via the OLN 10 may have appropriate addressing headers and information such that the OLN CMS can appropriately redirect the messages to SCS field devices via D2D transport layers within the OLN.

In implementations, as depicted in FIG. 8, the SCS CM data transfer may occur between the SCS CM and an external network. In various implementations, the smart city system central manager 21 may have data or a message to transfer to an SCS field device 22 which is now disconnected from the SCS network due to a network failure or disruption as depicted in FIGS. 2A and 2B. In options, the SCS CM may determine that a message needs to be sent to the SCS field device 22, as depicted at step 572. Once the smart city system central manager 21 determines a message and an appropriate field device identifier, the SCS CM may determine that the communication systems is currently in failure mode and communication link 23 is down. As noted, the SCS CM 21 has a communication detect process 231 which may determine that there has been a communication failure as indicated at step 574. Next, in some applications, the SCS CM may determine that the outdoor lighting network location that is directly adjacent to the destination field device 22 is a relevant target and connectivity infrastructure based upon the services map 250A/150A and may then determine and calculate a communication path to the field device 22. The SCS CM may then determine whether or not the C2C communication link 30 is active and if so, the smart city system central manager 21 may forward a message via the C2C pathway 30 to the outdoor lighting network CMS 11 of the communication failure and communication failure status at step 580 which would then switch the outdoor lighting network CMS and various field devices 12 to the D2D communication mode as indicated at step 582 after which the OLN message handling service 672 may begin.

Alternatively, in some embodiments, the C2C pathway being inactive may cause the SCS CM 21 to send the data to the OLN network via D2D communication mode 214 at step 586. The OLN message processor 212 may then encode the outbound message to the field devices through the D2D mode at step 588 and the SCS CM may transmit to the OLN device 12 via the D2D mode and communication link 42 at step 590.

Figure 9:
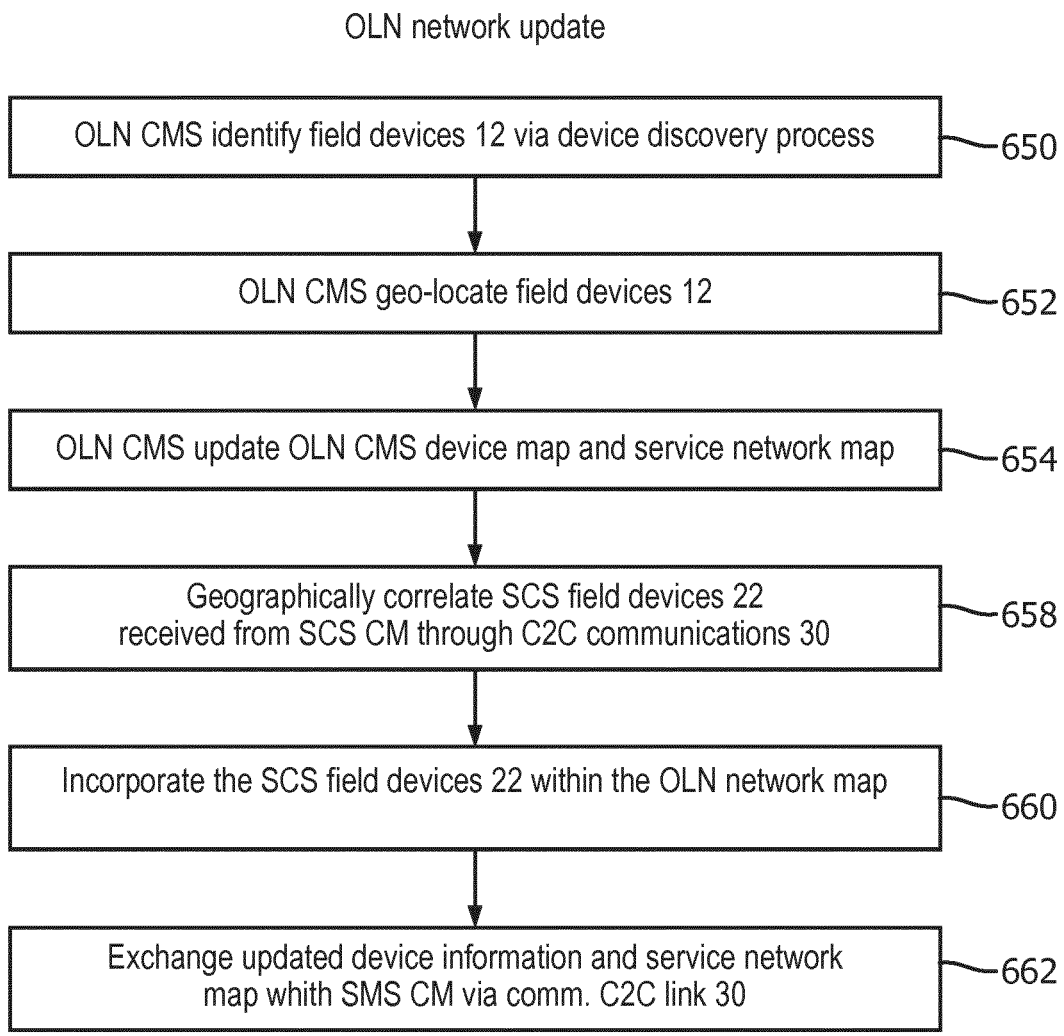
FIG. 9 is a flowchart illustrating an example method of determining field devices in an OLN and updating integrated device information and service maps.

As outlined in FIG. 9, an exemplary flow chart for the outdoor lighting network system and field device update is provided. In some embodiments, the OLN CMS may identify field devices 12 via the device discovery process 132 at step 650. Next the OLN CMS may also further geo-locate field devices 12 within the network map at step 652 and then the OLN CMS may update the OLN CMS device map and service network map 150B/250B with the relevant information at step 654. The OLN CMS 11 may further geographically correlate the SCS field devices 22 received from the SCS CM through the C2C communications 30 at step 658 and then incorporate the SCS field devices 22 within the OLN network map at step 660. Finally, in some embodiments, data may be exchanged and updated, including device information data and service network map information with the SCS CM via the communication link C2C 30 at step 662.

Figure 10A:
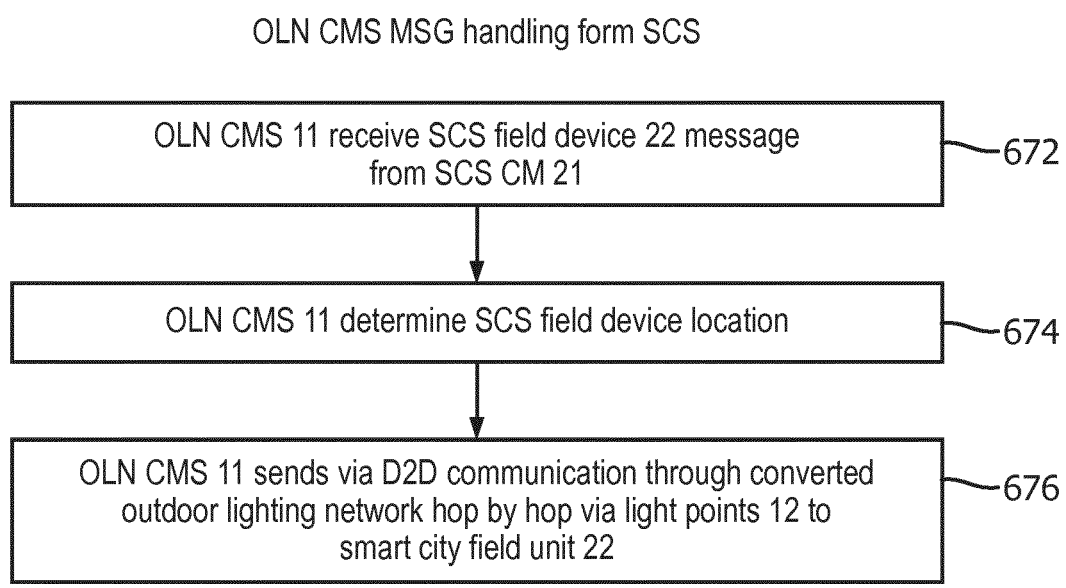
FIG. 10A is a flow chart illustrating an example method of managing message and data traffic in the outdoor lighting network after primary communications line failure.

The OLN CMS 11 may optionally have a message handling process for messages received from the smart city system central manager 21 as depicted in FIG. 10A. Such process may include, in some implementations, the OLN CMS 11 receiving the SCS field device messages or data from the SCS CM at step 672 and, in response thereto, the OLN CMS may determine the SCS field device location from the various databases and maps 150B/250B which are currently available to the OLN CMS. As indicated, these field device maps and OLN device maps may be correlated, combined or kept in a remote location in conjunction with the smart city system central manager 21 device maps. Finally, the OLN CMS 11 may send via D2D communication through the converted outdoor lighting network hop-by-hop via field device units 12 to the SCS field device 22 step 676 as is depicted in FIG. 2A.

Figure 10B:
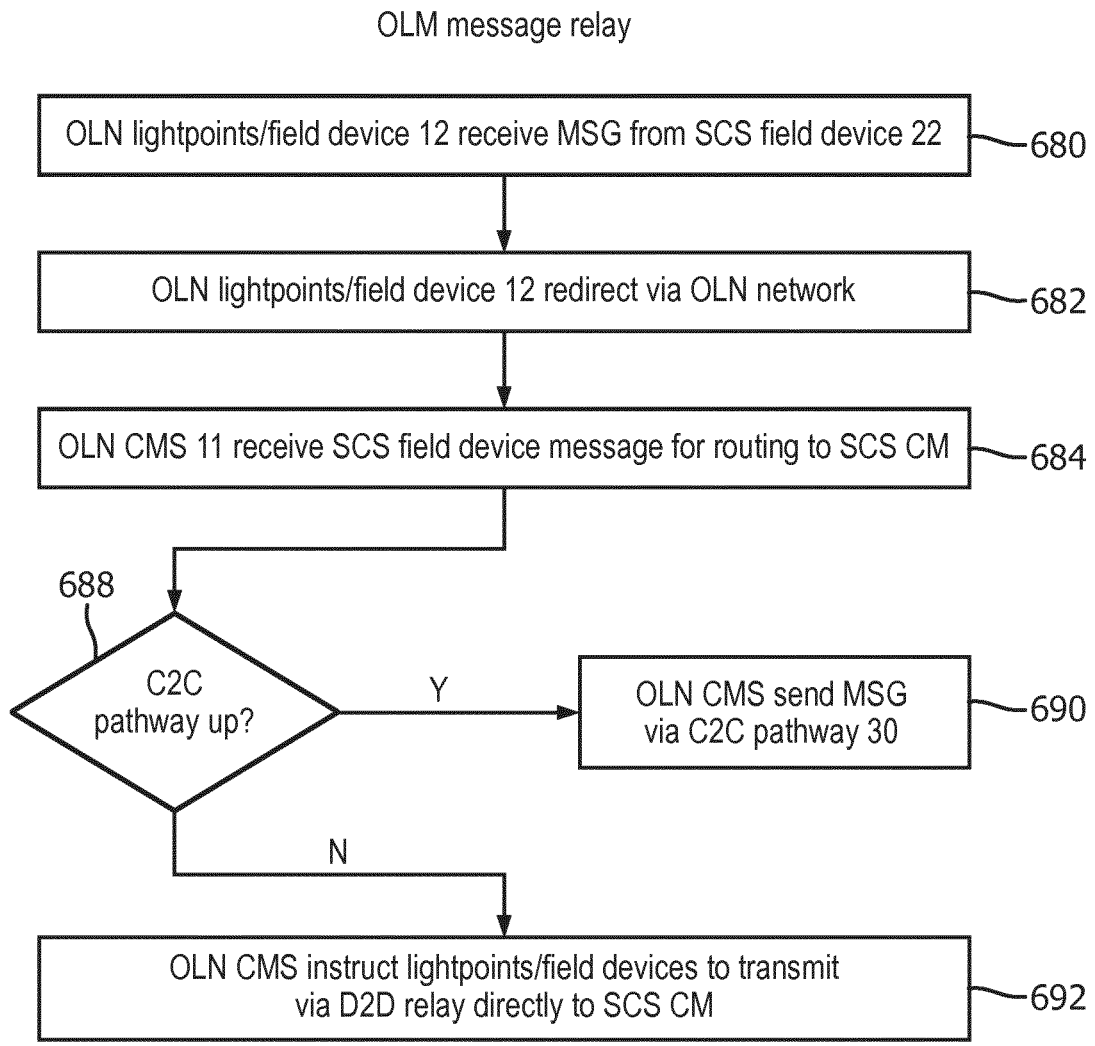
FIG. 10B is a flow chart illustrating an example method of managing direct D2D messages in the outdoor lighting network.

The outdoor lighting network which is utilized as a contingency connectivity infrastructure may also implement message handling through the individual light points received directly from the SCS network and particularly from the SCS CM 21 or individual field devices 22, as shown in the flowchart of FIG. 10B. Initially, the OLN light point or field device 12 may receive the message from the SCS field device 22 at step 680. The message or data may include destination or other routing information appended thereto for handling by the individual light points in the OLN.

The OLN light point or field device 12 then redirects the received SCS field device 22 message via the OLN network 10 to an adjacent light point 12 through device to device communication links. At step 684, the OLN CMS 11 may eventually receive the rerouted message for routing directly to the SCS CM at step 684.

The originating message from the SCS network may also initially be routed through multiple SCS field devices 22 as well, all through D2D communication protocols by virtue of the each of the field devices discovering nearby field devices by hop-by-hop or relay communication.

Once the OLN CMS 11 receives the message for routing, a determination will be made of whether the C2C pathway is viable at step 688. If the C2C communication link is available, the OLN CMS will forward the message via the C2C pathway 30 to the SCS CM 21 at step 690. Alternatively, if the C2C pathway is not available, the OLN CMS 11 may instruct the light points or field devices to directly transmit via D2D relay from the OLN infrastructure directly to the SCS CM 21 utilizing the D2D protocol. In alternative embodiments, the OLN CMS may have D2D communications capability to bypass the C2C communication link 30 and directly transmit through D2D communications possibly. However, given the breadth and scope of the geographic displacement of the OLN field units and/or light points, it is likely that an individual light point within the OLN will be available for direct transmission to the SCS CM in such an instance, the OLN CMS may direct the individual light points to redirect via alternative pathways any message routed to the SCS CM and bypass the OLM CMS.

Figure 12:
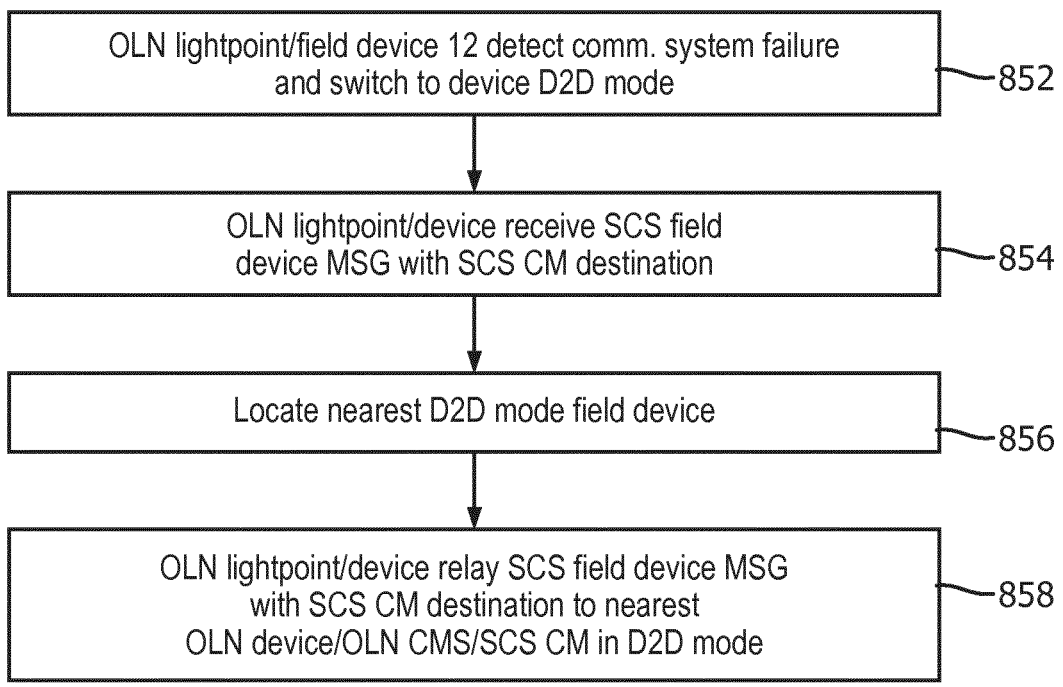
FIG. 12 is a flow chart illustrating an example method of an OLN light point transitioning to D2D mode during communications line failure.

As depicted in FIG. 12, the OLN light points may be operable to detect a communication system failure and autonomously switch from a primary protocol to a secondary D2D protocol. At step 852, the OLN light point 12 may detect such communication failure and switch to D2D communication mode. At step 854, the OLN light point may receive an SCS field device message from an adjacent field device 22 out of the outdoor lighting network but wherein the out of network field device has itself switched to D2D communication mode. At step 856, the OLN device 12 may similarly discover adjacent or nearby D2D capable light points for transmission of the message and relay thereof. Finally at step 858, the OLN light point may relay SCS field device message which may include an SCS CM destination, the relay occurring to the nearest OLN field device and/or D2D capable device for transmission for the destination address.

Figure 11:
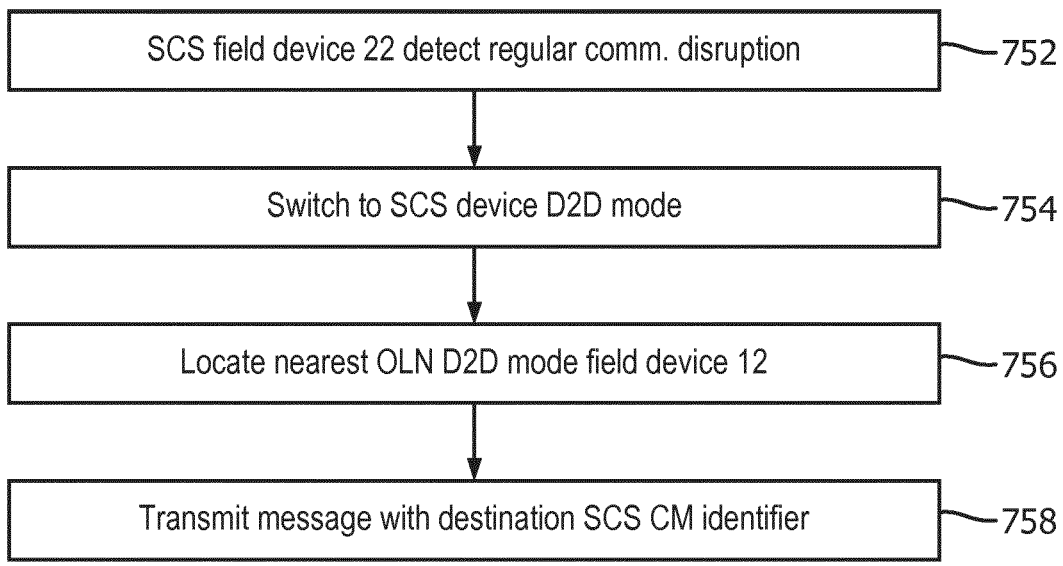
FIG. 11 is a flow chart illustrating an example method of an SCS User Equipment/Field Device transitioning to D2D mode during communications line failure.

Alternatively, as depicted in FIG. 11, a similar device detect and switch of communication protocols is shown for the field devices 22. At step 752, the SCS field device 22 may detect a regular communication disruption either autonomously or through a broadcast communication or other means. At step 754 the field device 22 may switch to D2D mode and at step 756, the device may locate the nearest OLN D2D mode capable field device 12 through a discovery process. After such discovery of an adjacent OLN field device, the SCS field device 22 may transmit the data or message with the appropriate destination and address information to the out of network device for relay or hop-by-hop transmission and D2D protocol. As may be understood, relays through D2D communication protocol may occur within network, out of network or cross over networks, as long as the appropriate addressing information is provided which is why the implementation of an outdoor lighting network with such wide geographic dispersal is beneficial as a contingency communications network.

Figure 13A:
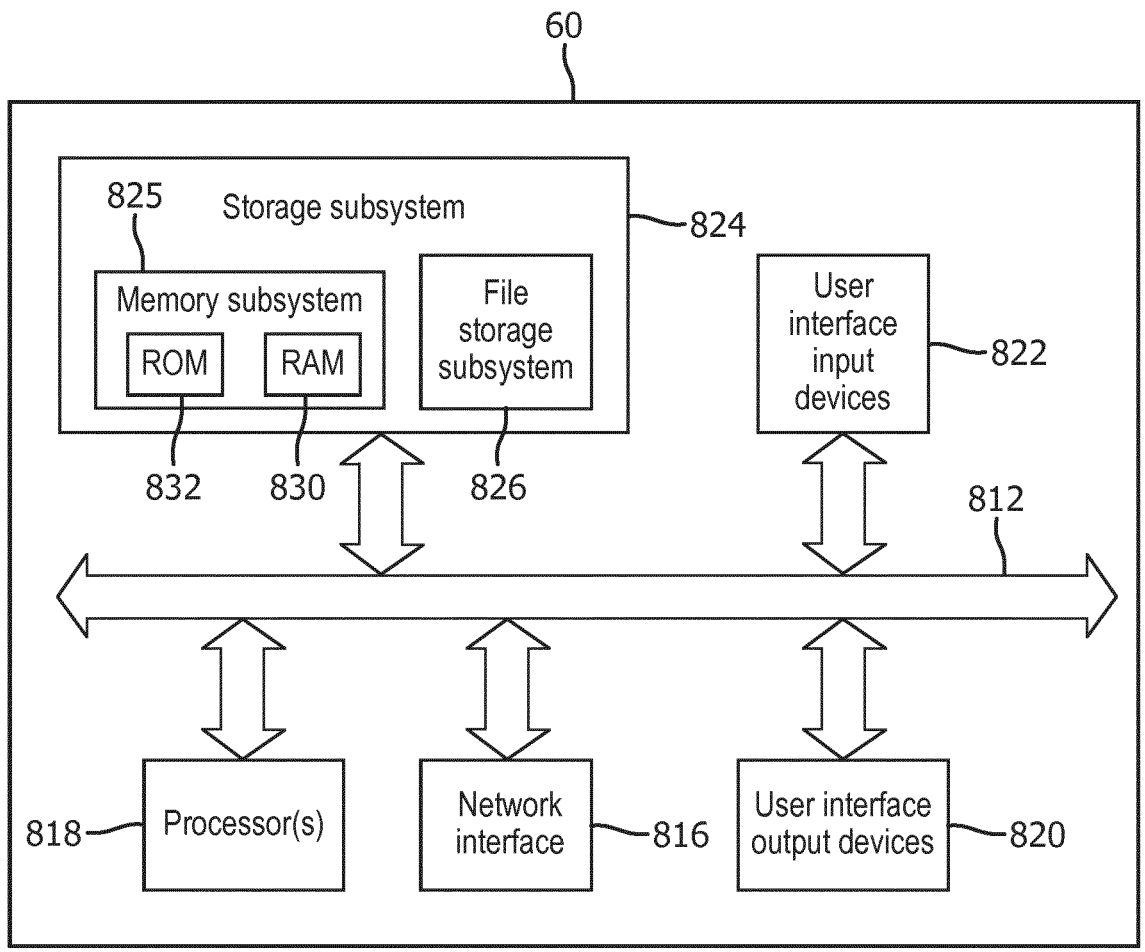
FIG. 13A schematically depicts an example architecture of an outdoor lighting system central management computer system and server.

As shown in FIG. 13A, an exemplary schematic of an OLN management system server is depicted which includes a storage subsystem 824, memory subsystem 825, which may include ROM 832 and RAM 830. The storage subsystem 824 may also include a file storage subsystem 826. An bus 812 may connect the storage subsystem with various processors 818, as well as a network interface 816 which may include the different communication protocol transmitters for both the C2C communication link 30 and the communication protocol link for the OLN 13. In further embodiments, the network interface may also provide communication in D2D mode as depicted in FIG. 2B for communication in such device to device protocol between the server and light points but also other communication end points. As well, user interface and output device 820 may be provided for inclusion and user interface. The schematic of FIG. 13A is depicted merely as an example of implementation for the management system server for the outdoor lighting network or of the smart city system network CM server and neither of them need necessarily include each of the sub-elements noted therein.

Figure 13B:
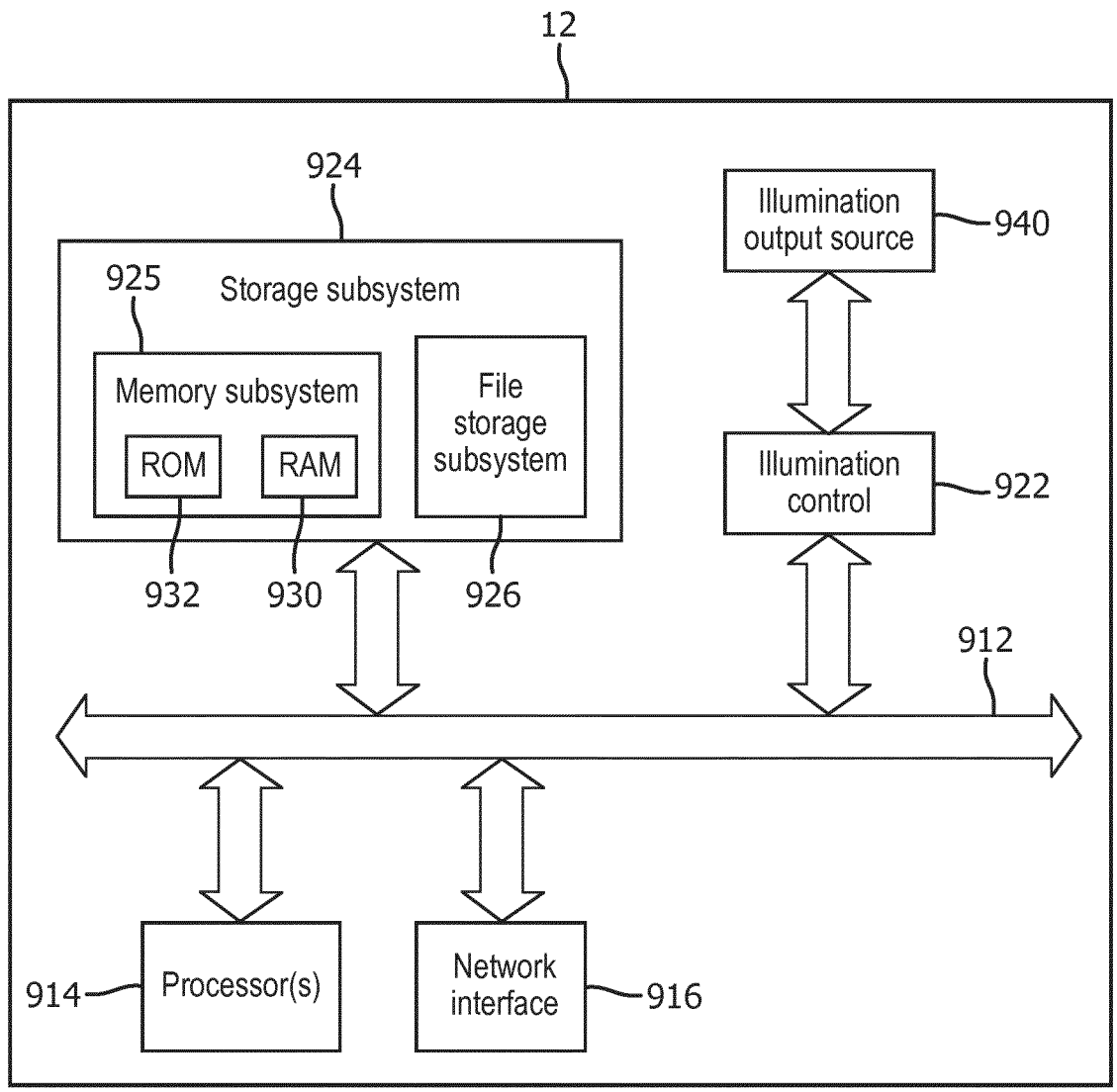
FIG. 13B schematically depicts an example architecture of an outdoor lighting system light point or field device.

As shown in FIG. 13B, an exemplary schematic of an OLN light point or field device 12 is depicted which includes a storage subsystem 924, memory subsystem 925, which may include ROM 932 and RAM 930. The storage subsystem 924 may also include a file storage subsystem 926. An interconnectivity bus 912 may connect the storage subsystem with various processors 914, as well as a network interface 916 which may include the both the first communication protocol and second communication protocol transmitters and required communication electronics. The light point may further include in various implementations of illumination sources, sensing and detection mechanisms and various control hardware and software. The Illumination output source 940 may be wide area illumination, street lighting, flood or wall wash illumination or any other desired outdoor illumination and may include a corresponding illumination or lighting control 922 which may communicate with the associated storage subsystem and/or processors as needed. The controller may as well be implemented by the processor 914 or may have individual light controllers for each illumination source, such as an LED, or for groups of illumination sources. The schematic of FIG. 13B is depicted merely as an example of implementation for the various light points and field devices of the outdoor lighting network or of the smart city system network and neither of them need necessarily include each of the sub-elements noted therein.

As depicted, the field devices may incorporate the utilization of memory subsystems and a file storage subsystem but need not include all or both. As well, the network interface may include support from the memory subsystems for the various communication protocols for the underlying outdoor lighting network or the underlying smart city system network. Such protocols may also include alternative D2D protocols for each of the devices being implemented with full support and instructions stored in the memory subsystem, which can be executed by the processor in order to implement the various functionality elements and aspects described herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the technique is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. An outdoor lighting system for use as a contingency connectivity infrastructure, comprising:
    an outdoor lighting network management system, the outdoor lighting network management system in communication with a plurality of light points forming an outdoor lighting network, each of the plurality of light points emitting illumination and communicating with other light points and the outdoor lighting network management system by first communication protocol having a first message prioritization method, wherein the outdoor lighting system assigns message priorities according to a first predetermined criteria;
    wherein each of the light points in the outdoor lighting network has instructions stored in a memory and a processor to execute the instructions to:
    switch the light point to a second communication protocol, the second communication protocol a device to device protocol wherein each of the light points is operable to transmit a message to a geographically adjacent light point in the outdoor lighting network, the second communication protocol having a second message prioritization method, wherein the outdoor lighting system assigns message priorities according to a second predetermined criteria;
    further wherein each of the light points in the outdoor lighting network further has instructions to communicate with a field device of a separate system network not associated with the outdoor lighting network by the second communication protocol;
    wherein the second communication protocol is a device-to-device (D2D) cellular communication protocol;
    and wherein each of the outdoor lighting network light points is operable to autonomously switch between the first communication protocol and the second communication protocol.

2. The outdoor lighting system of claim 1 wherein the outdoor lighting network management system has instructions stored in a memory and a processor to execute the instructions to communicate in a normal communication mode to communicate with the plurality of light points of the outdoor lighting network in the first communication protocol and a device-to-device communication mode to communicate with the plurality of light points in the second communication protocol.

3. The outdoor lighting system of claim 2 wherein the outdoor lighting network management system includes a message processor, the message processor operable to receive a message from the separate system network and decode the received message and to further encode the message to be recognized by the plurality of light points when communicated in the device-to-device communication mode.

4. The outdoor lighting system of claim 3 wherein the outdoor lighting network management system includes a device and mapping mechanism which is operable to geographically correlate a plurality of field devices from the separate system network to a lighting network service map.

5. The outdoor lighting system of claim 4 wherein the outdoor lighting network management system further includes a map correlator to correlate the lighting network service map and a service map from the separate system network.

6. The outdoor lighting system of claim 1 wherein the outdoor lighting network management system is a part of a larger computer network, the larger computer network defining a smart city system, the smart city system having a manager server, the manager server in communication with a plurality of smart city systems, the outdoor lighting network one of the plurality of smart city systems.

7. The outdoor lighting system of claim 6 wherein the smart city system further includes a plurality of distributed system components, at least one of the distributed system components being a plurality of smart city field devices, at least one of the smart city field devices including the field device of the separate system network.

8. The outdoor lighting system of claim 6 wherein the first communication protocol is unique to the outdoor lighting network and wherein the second protocol is a device to device protocol.

9. The outdoor lighting system of claim 8 wherein the outdoor lighting network light points communicate in the second protocol and transmits data through a plurality of devices until the data reaches a destination.

10. The outdoor lighting system of claim 9 wherein the outdoor lighting network light points include instructions to implement a dynamic routing algorithm to allow each outdoor lighting network light point to include routing information in the transmitted data.

11. The outdoor lighting system of claim 6 wherein the first communication protocol is a cellular based protocol.

12. The outdoor lighting system of claim 11 wherein the first communication protocol is a mesh network based protocol.

13. The outdoor lighting system of claim 1 wherein the outdoor lighting network light points are each operable to enter a discovery mode, wherein the discovery mode discovers nearby devices, the nearby devices being either adjacent outdoor lighting network light points or field devices of the separate system network.

14. A method for providing a contingency connectivity infrastructure using an outdoor lighting network, comprising:
- forming an outdoor lighting network with a plurality of light points;
- communicating between the plurality of light points and a lighting network management system in a first communication protocol having a first message prioritization method, wherein the outdoor lighting network assigns message priorities according to a first predetermined criteria;
- switching the plurality of light points from the first communication protocol to a second communication protocol, the second communication protocol a proximate device to device communication protocol, the second communication protocol having a second message prioritization method, wherein the outdoor lighting network assigns message priorities according to a second predetermined criteria;
- receiving by a recipient one of the light points from the outdoor lighting network, a data stream including a destination address, the destination address being outside of the outdoor lighting network, the data stream being transmitted by a device outside of the outdoor lighting network;
- transmitting by the recipient light point in the outdoor lighting network, the data stream in the second communication protocol to an adjacent recipient device, the adjacent recipient device being either one of the plurality of light points from the outdoor lighting network or an external device outside of the outdoor lighting network;
- wherein the switching by the plurality of light points between the first communication protocol to the second communication protocol is done autonomously.

* * * * *